United States Patent
Ikeda et al.

(10) Patent No.: US 7,177,821 B2
(45) Date of Patent: Feb. 13, 2007

(54) MAINTENANCE INFORMATION MANAGEMENT SYSTEM AND METHOD OF PROVIDING A MAINTENANCE PLAN

(75) Inventors: Hiraku Ikeda, Hitachinaka (JP); Seio Kanda, Hitachi (JP); Tooru Horie, Hitachiota (JP); Toshiyuki Ueda, Tokai (JP); Kenzo Semba, Hitachi (JP)

(73) Assignees: Hitachi, Ltd., Tokyo (JP); Hitachi Engineering & Services Co., Ltd., Hitachi (JP)

( * ) Notice: Subject to any disclaimer, the term of this patent is extended or adjusted under 35 U.S.C. 154(b) by 0 days.

(21) Appl. No.: 10/745,522

(22) Filed: Dec. 29, 2003

(65) Prior Publication Data

US 2004/0138967 A1 Jul. 15, 2004

Related U.S. Application Data

(63) Continuation of application No. 09/793,115, filed on Feb. 27, 2001, now abandoned.

(30) Foreign Application Priority Data

Jul. 21, 2000 (JP) .............................. 2000-226194

(51) Int. Cl.
G06F 17/50 (2006.01)
(52) U.S. Cl. .............................. 705/7; 705/28; 705/29
(58) Field of Classification Search ................ 705/28, 705/29, 22, 23, 7, 8, 9, 10
See application file for complete search history.

(56) References Cited

U.S. PATENT DOCUMENTS

| | | | |
|---|---|---|---|
| 5,210,704 A | 5/1993 | Husseiny | |
| 5,216,612 A | 6/1993 | Cornett et al. | |
| 5,231,594 A | 7/1993 | Knibiehler et al. | |
| 5,343,387 A | 8/1994 | Honma et al. | |
| 5,533,413 A | 7/1996 | Kobayashi | ................. 73/865.9 |
| 5,581,486 A | 12/1996 | Terada et al. | |

(Continued)

FOREIGN PATENT DOCUMENTS

JP 62-276470 12/1987

(Continued)

OTHER PUBLICATIONS

Paz, Noemi M Leigh, William, "Maintenance scheduling: Issues, results and research needs", International Journal of Operations & Produciton Management, v14n8, p. 47-69, 1994 (Includes Charts and References).*

(Continued)

*Primary Examiner*—F. Zeender
(74) *Attorney, Agent, or Firm*—Mattingly, Stanger, Malur & Brundidge, P.C.

(57) ABSTRACT

In a maintenance management system and a method of providing engineering support, maintenance information concerning generating plants owned by a user is provided to a maker, and the maker analyzes such items of information, and manages the information in a structure maintenance management system. The user accesses the maintenance management system through the Internet, extracts information to be obtained from databases, and implements maintenance activities or drafts a plan. Engineers of the maker register maintenance information through an intranet, and provide engineering support for the maintenance activities promoted by the user.

2 Claims, 33 Drawing Sheets

U.S. PATENT DOCUMENTS

| | | |
|---|---|---|
| 5,777,877 A | 7/1998 | Beppu et al. |
| 6,003,808 A | 12/1999 | Nguyen et al. |
| 6,006,171 A | 12/1999 | Vines et al. |
| 6,125,312 A | 9/2000 | Nguyen et al. |
| 6,442,459 B1 | 8/2002 | Sinex |
| 2002/0035495 A1 | 3/2002 | Spira et al. |

FOREIGN PATENT DOCUMENTS

| | | |
|---|---|---|
| JP | 4121694 | 4/1992 |
| JP | 5168070 | 7/1993 |
| JP | 8261886 | 10/1996 |
| JP | 9-097285 | 4/1997 |
| JP | 9251469 | 9/1997 |
| JP | 10021271 | 1/1998 |
| JP | 11-85262 | 3/1999 |
| JP | 11238050 | 8/1999 |
| JP | 0019318 | 4/2000 |

OTHER PUBLICATIONS

Yeates, D. et al, "Systems Design: Databases", Systems Analysis and Design, Prentice Hall, 1994, pp. 303-319.

Hay, D., "A Framework for Architecture", Requirements Analysis From Business Views to Architecture, Prentice Hall, 2003, pp. 1-8.

* cited by examiner

FIG. 7
Generating Plant
Maintenance Management System
HITACHI
PS Name 
69
Unit No. 
70

FIG. 13

| No. | Parts Name | Number | Material | Size | Stock | Delivery | Notes |
|---|---|---|---|---|---|---|---|
| | | | | | | | |
| 2 | Bolt | 4 | Carbon Steel | M20L85 | 4 | 1 months | |
| 3 | Dowel | 1 | Carbon Steel | φ20 | 0 | 1 months | |
| 4 | Pin | 1 | Carbon Steel | φ20L63 | 0 | 1 months | |
| 5 | Bearing Ring | 1 | Carbon Steel | In.Dia. φ533.4 | 0 | 6 months | |
| 6 | Bolt | 4 | Carbon Steel | M30L220 | 4 | 1 months | |
| 7 | Dowel | 2 | Carbon Steel | φ26 | 0 | 1 months | |
| 8 | Bolt | 4 | Carbon Steel | G21156 | 0 | 1 months | |
| 9 | Plate | 4 | Carbon Steel | | 0 | 1 months | |
| 10 | Liner | 1 | Carbon Steel | | 0 | 1 months | |
| 11 | Shim | 1 | Stainless Steel | | 0 | | |
| 12 | Liner | 2 | Carbon Steel | | 0 | 1 months | |
| 13 | Shim | 2 | Stainless Steel | | 0 | | |
| 14 | Liner | 1 | Carbon Steel | | 0 | 1 months | |
| 15 | Shim | 1 | Stainless Steel | | 0 | | |
| 16 | Liner | 1 | Carbon Steel | | 0 | 1 months | |
| 17 | Shim | 1 | Stainless Steel | | 0 | | |
| 18 | Liner | 1 | Carbon Steel | | 0 | 1 months | |
| 19 | Shim | 1 | Stainless Steel | | 0 | | |
| 20 | Bolt | 16 | Carbon Steel | M12 | 0 | 1 months | |

Turbine — No.1 Journal Bearing

FIG. 14

| Turbine | | No.1 Journal Bearing | | | | | | | | | | |
|---|---|---|---|---|---|---|---|---|---|---|---|---|
| | | | | 1998 | | | 1999 | | | 2000 | | |
| No. | Parts Name | Number | In | Out | Stock | In | Out | Stock | In | Out | Stock | In |
| 1 | Bearing | 1 | 2 | 1 | 1 | 0 | 0 | 1 | 2 | 1 | 1 | 0 |
| 2 | Bolt | 4 | 4 | 0 | 4 | 0 | 0 | 4 | 4 | 0 | 4 | 0 |
| 3 | Dowel | 1 | 0 | 0 | 0 | 0 | 0 | 0 | 0 | 0 | 0 | 0 |
| 4 | Pin | 1 | 0 | 0 | 0 | 0 | 0 | 0 | 0 | 0 | 0 | 0 |
| 5 | Bearing Ring | 1 | 0 | 0 | 0 | 0 | 0 | 0 | 0 | 0 | 0 | 0 |
| 6 | Bolt | 4 | 4 | 0 | 4 | 0 | 0 | 4 | 4 | 4 | 0 | 0 |
| 7 | Dowel | 2 | 0 | 0 | 0 | 0 | 0 | 0 | 0 | 0 | 0 | 0 |
| 8 | Bolt | 4 | 0 | 0 | 0 | 0 | 0 | 0 | 0 | 0 | 0 | 0 |
| 9 | Plate | 4 | 0 | 0 | 0 | 0 | 0 | 0 | 1 | 0 | 0 | 0 |
| 10 | Liner | 1 | 1 | 1 | 0 | 0 | 0 | 0 | 0 | 1 | 0 | 0 |
| 11 | Shim | 1 | 0 | 0 | 0 | 0 | 0 | 0 | 0 | 0 | 0 | 0 |
| 12 | Liner | 2 | 0 | 0 | 0 | 0 | 0 | 0 | 0 | 0 | 0 | 0 |
| 13 | Shim | 2 | 2 | 2 | 0 | 0 | 0 | 0 | 2 | 2 | 0 | 0 |
| 14 | Liner | 1 | 0 | 0 | 0 | 0 | 0 | 0 | 0 | 0 | 0 | 0 |
| 15 | Shim | 1 | 1 | 1 | 0 | 0 | 0 | 0 | 1 | 1 | 1 | 0 |
| 16 | Liner | 1 | 0 | 0 | 0 | 0 | 0 | 0 | 0 | 0 | 0 | 0 |
| 17 | Shim | 1 | 1 | 1 | 0 | 0 | 0 | 0 | 1 | 1 | 1 | 0 |
| 18 | Liner | 1 | 0 | 0 | 0 | 0 | 0 | 0 | 0 | 0 | 0 | 0 |
| 19 | Shim | 1 | 1 | 1 | 0 | 0 | 0 | 0 | 1 | 1 | 1 | 0 |
| 20 | Bolt | 16 | 0 | 0 | 0 | 0 | 0 | 0 | 0 | 0 | 0 | 0 |

| Turbine | | No,1 Journal Bearing | |
|---|---|---|---|
| No. | Name | | |
| 1 | Inspection Check Sheet | | |
| 2 | Assembly Record | | |
| 3 | Contact Check Record | | |
| 4 | Shim Thickness Record | | |
| 5 | | | |

Inspection Check Sheet 94  [No.1 Journal Bearing ▼] 95    Registered data 113    → To Criteria ▲

| No. | Inspection Item | Implementation Yes | Implementation No | 96 | Results 97 |
|---|---|---|---|---|---|
| 1 | Oil gap | ✓ | | [ ] mm | [ satisfied ▼] |
| 2 | Oil gap difference between front and rear side | ✓ | | [ ] mm | [ unsatisfied ▼] |
| 3 | Seasonig wear loss | ✓ | | [ ] mm | [ ▼] |
| 4 | Contact trace width of journal bearing | | ✓ | | [ ▼] |
| 5 | PT for babbitt metal | ✓ | | | [ ▼] |
| 6 | UT for babbitt metal | | ✓ | | [ ▼] |
| 7 | Contact trace of liner pad of bearing ring | ✓ | | | [ ▼] |
| 8 | Contact trace of ball seat | | | | [ ▼] |
| 9 | Ball seat gap | | | | [ ▼] |
| 10 | Dowel pin gap of bearing ring | | | | [ ▼] |
| 11 | Difference of horizontal gap of bearing ring | | | | [ ▼] |
| 12 | Tightening torque of bearingring bolts | | | | [ ▼] |
| 13 | Bearing babbitt flinger relief | | | | [ ▼] |
| 14 | Parallelism of journal bearing to rotor journal | | | | [ ▼] |

Inspection date : _____
Inspected by : _____

FIG. 18

Detail data input sheet

| Field | Value | Ref |
|---|---|---|
| Unit No. | 1 | 98 |
| Facility | Bearing | 99 |
| Year/Month | 2000/07 | 100 |
| Parts Name 1 | No.1 Journal Bearing | 101 |
| Parts Name 2 | Bearing Metal | 102 |
| Work/Inspection | PT | 103 |
| Phenomena | Crack | 104 |
| Cause | | 105 |
| Countermeasure | Replace | 106 |
| Comments | Crack was found out on babbitt metal. It was 20 mm. | 107 |
| Bitmap File | BRG001.bmp | 108 |
| Relating Record | T-015 | 109 |

Reflect to planning management: [Reflection] 110

FIG. 19

No.1 Journal Bearing Inspection Check Sheet

To Check Sheet →

| No. | Inspection Item | Results |
|---|---|---|
| 1 | Oil gap | Design 0.0013D to 0.0013D+0.1mm<br>Allowance Max. 0.002D(D:Journal Diameter) |
| 2 | Oil gap difference between front and rear side | Allowance 0.0002L mm<br>L:Effective bearing width |
| 3 | Seasonig wear loss | Allowance Initial gap + 0.08mm |
| 4 | Contact trace width of journal bearing | The average value of contact trace width of front, center, rear saide of journal bearing shall be 0.3D to 0.5D. |
| 5 | PT for babbitt metal | Periphery direction : Less than 1/3 of a half periphery length<br>Axial direction : Less than 1/4 of total length |
| 6 | UT for babbitt metal | Over laying : Unbonded area is less than or equal to 20% or 25x25<br>Replace : Unbonded area is more than 20% |
| 7 | Contact trace of liner pad of bearing ring | Allowance More than 95% at 45° from bottom center line and 80 % to slight contact trace at side liner pads. |
| 8 | Contact trace of ball seat | |
| 9 | Ball seat gap | |
| 10 | Dowel pin gap of bearing ring | |
| 11 | Difference of horizontal gap of bearing ring | |
| 12 | Tightening torque of bearingring bolts | |
| 13 | Bearing babbitt flinger relief | |
| 14 | Parallelism of journal bearing to rotor journal | |

| Turbine | | Bearing | |

| No. | Name |
|---|---|
| 1 | Maintenance History |
| 2 | Technical Information Sheet |
| 3 | Data Trend |
| 4 | |
| 5 | |

Turbine — Bearing

Search Cord

| | | | | |
|---|---|---|---|---|
| Unit No. | 1 | Facility | Year/Month | 2000/05 |
| Parts Name 1 | No.1 BRG | Parts Name 2 | Bearing | Work/Inspection | BRG Metal | PT |
| Phenomena | Crack | Cause | | Countermesure | Replace |

Unit No.
Year/Month
Parts Name 1
Parts Name 2
Work/Inspection
Phenomena
Cause
Countermesure
Comments

FIG. 25

Turbine    Bearing

132

Search Cord

Unit No. ▸            ▸ Date of Issue

Facility ▸           ▸ Sheet No.

Parts Name

| Unit No. 1 | | Facility | Bearing | | | | | | | |
|---|---|---|---|---|---|---|---|---|---|---|
| Date of Issue | Parts Name | Sheet No. | | | | Comments | | | | |
| | | | | | | | | | | |
| | | | | | | | | | | |
| | | | | | | | | | | |
| | | | | | | | | | | |
| | | | | | | | | | | |

Turbine   Bearing

Data Trend Menu

| No. | Name |
|-----|------|
| 1 | Oil Gap |
| 2 | Ball Seat Gap |
| 3 | Contact Trace Width |
| 4 | |
| 5 | |

| Turbine | | Bearing | | | |
|---|---|---|---|---|---|
| No. | Name | | | | |
| 1 | Registered maintenace Work List | | | | |
| 2 | User Input List | | | | |
| 3 | Yearly Maintenance List | | | | |
| 4 | | | | | |
| 5 | | | | | |

Turbine | Bearing

Registered Maintenance Work List

Year/Month of planned act [ ] ~144    Registration ~145

Facility   Bearing

Unit No. 1

| | Year/Month | Parts Name 1 | Parts Name 2 | Work/Inspection | Phenomena | Cause |
|---|---|---|---|---|---|---|
| 1 | 1997/05 | No.1 BRG | Bearing | PT inspection | Crack | |
| 2 | 1997/05 | No.1 BRG | Bearing | Contact check | Wide Width | |
| 3 | 1997/05 | No.1 BRG | Bearing Ring | Contact check | | |
| 4 | 1997/05 | No.1 BRG | Bearing Ring | Torque check | Vibration | |
| 5 | 1997/05 | No.1 BRG | Bearing | PT inspection | Crack | |
| 6 | 1997/05 | No.1 BRG | Bearing | Contact check | Wide Width | |
| 7 | 1997/05 | No.1 BRG | Bearing Ring | Contact check | | |
| 8 | | | Bearing Ring | Torque check | Vibration10 | |
| 9 | | | | | | Registration |
| 10 | | | | | | |

Turbine    Bearing

User Register List planned Year/Month    2001/06 ~147

Facility    Bearing

Registration ~148

| Unit No. 1 | | | | | | |
|---|---|---|---|---|---|---|
| | Year/Month | Parts Name 1 | Parts Name 2 | Work/Inspection | Phenomena | Cause |
| 1 | | | | | | |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |

| Turbine | | Bearing | | | | |
|---|---|---|---|---|---|---|

Yearly Maintenance List planned Year/Month  2001/06

Unit No. 1   Facility   Bearing

| | Year/Month | Parts Name 1 | Parts Name 2 | Work/Inspection | Phenomena | Cause |
|---|---|---|---|---|---|---|
| 1 | 1997/05 | No.1 BRG | Bearing | PT | Crack | |
| 2 | 1997/05 | No.1 BRG | Bearing | Contact check | Wide Width | |
| 3 | 1997/05 | No.1 BRG | Bearing Ring | Contact check | | |
| 4 | 1997/05 | No.1 BRG | Bearing | PT inspection | Crack | |
| 5 | 1997/05 | No.1 BRG | Bearing | Contact check | Wide Width | |
| 6 | 1997/05 | No.1 BRG | Bearing Ring | Contact check | | |
| 7 | | | | | | |
| 8 | | | | | | |
| 9 | | | | | | |
| 10 | | | | | | |

MAINTENANCE INFORMATION MANAGEMENT SYSTEM AND METHOD OF PROVIDING A MAINTENANCE PLAN

This is a continuation application of U.S. Ser. No. 09/793,115, filed Feb. 27, 2001 now abandoned.

BACKGROUND OF THE INVENTION

The present invention relates to a maintenance information management system for managing information on the maintenance of power generating plants or the like, as well as a method of providing a maintenance plan.

In the conventional management of generating-plant maintenance information, users store inspection reports submitted by engineers dispatched from makers and technical data presented by makers, and makes effective use of them as preventive maintenance information. Meanwhile, makers also manage inspection reports and technical data, and indirectly provide engineering support for maintenance activities planned by users, by using such data. For example, when a user requires a maker's engineering support at the time of drafting a maintenance plan, the engineering support is provided in the form of responding to an inquiry from the user. Listed below are the details of the generally practiced management of maintenance information and engineering support on the part of the maker for maintenance activities.

(1) When conducting maintenance activities such as periodic inspection, the user requests the maker to dispatch engineers, and manages inspection reports submitted by the maker. Ensuing maintenance activities are planned on the basis of these reports.

(2) The maker stores and manages the inspection reports prepared by the engineers, and rearranges information necessary for the ensuing maintenance activities as technical data and supplies them to the user.

(3) At the time of drafting a plan on maintenance activities, the user takes into consideration the inspection reports and technical data submitted by the maker, and studies them. In addition, the user makes technical inquiries at the maker, as required, through telephone, facsimile, or the like, and drafts the plan on maintenance activities.

(4) Orders for dispatching of engineers necessary for the maintenance activities, arrangement for parts, and the like are placed with the maker through a business department.

(5) Before conducting the maintenance activities, the user and the maker make arrangements to mutually confirm the details of the maintenance activities, the period of dispatch of trainers, the date of delivery of the parts, and the like.

(6) The user carries out the maintenance activities on the basis of the drafted maintenance plan.

Namely, when carrying out maintenance activities for a generating plant, the user drafts a plan on the basis of the inspection reports and technical data submitted by the maker, and inquiries about unclear points and technical inquiries are made by using telephone and facsimile. Personnel from the maker visits the user, or personnel from the user visits the maker, so as to conduct mutual examination and confirmation, and the maintenance activities are then carried out.

It should be noted that, as a system for maintenance management of documents, including facility drawings, maintenance documents, and the like of such as plant facilities, Japanese Patent Application Laid-Open Hei 11-85262 (JP-A-11-85262), for instance, discloses a technique in which document information is managed in a centralized manner on the maker side, and information concerning a document is supplied to the user, as required.

As described above, since the conventional maintenance activities are planned on the basis of the maintenance information on a document basis, to formulate a maintenance plan by collecting past information and grasping the trend, a large amount of time and labor are involved in picking out data, so that much labor has been required on the part of the user. Hence, there has been a demand for a technique for performing such operations efficiently. In addition, since engineering support for the user has been conventionally carried out though telephone, facsimile, the mailing of documents, and the like, speedy and accurate engineering support has been desired.

In addition, although it is described in JP-A-11-85262 referred to above that document information is managed in a centralized manner on the maker side, the publication is not aimed at providing to the user information on the estimation of aged deterioration in the future and a maintenance plan concerning facilities subject to maintenance on the basis of the maintenance information collected in the past.

SUMMARY OF THE INVENTION

Accordingly, it is an object of the present invention to provide a maintenance information management system and a method of providing a maintenance plan which are capable of appropriately providing a maintenance plan for major component parts of facilities subject to maintenance.

To attain the above object, in accordance with the invention, there is provided a maintenance information management system comprising: a parts management database for storing parts information on major parts making up a facility subject to maintenance owned by a user; a history management database for storing a history of inspection or replacement of the major parts concerning said parts management database; and a planning management database for storing a maintenance plan concerning the major parts, the maintenance plan being made on the basis of estimation of a situation of aged deterioration in the future concerning the major parts on the basis of data stored in said parts management database and said history management database.

In addition, in accordance with the invention, there is provided a method of providing a maintenance plan concerning major parts making up a facility subject to maintenance owned by a user, comprising the steps of: storing in a parts management database parts information concerning the major parts making up the facility subject to maintenance owned by the user; storing in a history management database a history of inspection or replacement of the major parts concerning said parts management database; and estimating a situation of aged deterioration in the future concerning the major parts on the basis of data stored in said parts management database and said history management database, and providing a future maintenance plan concerning the major parts to the user on the basis of the estimation of the aged deterioration.

In accordance with the invention, an advantage is offered in that it is possible to provide a maintenance information management system and a method of providing a maintenance plan which are capable of appropriately providing a maintenance plan for major component parts of facilities subject to maintenance.

The above and other objects, features and advantages of the present invention will become more apparent from the following detailed description of the invention when read in conjunction with the accompanying drawings.

BRIEF DESCRIPTION OF THE DRAWINGS

FIG. 7 is a diagram illustrating a screen which is operated by a user and the maker;

FIG. 13 is a diagram illustrating a screen which is operated by the user and the maker;

FIG. 14 is a diagram illustrating a screen which is operated by the user and the maker;

FIG. 16 is a diagram illustrating a screen which is operated by the user and the maker;

FIG. 17 is a diagram illustrating a screen which is operated by the user and the maker;

FIG. 18 is a diagram illustrating a screen which is operated by the user and the maker;

FIG. 19 is a diagram illustrating a screen which is operated by the user and the maker;

FIG. 20 is a diagram illustrating a screen which is operated by the user and the maker;

FIG. 22 is a diagram illustrating a screen which is operated by the user and the maker;

FIG. 24 is a diagram illustrating a screen which is operated by the user and the maker;

FIG. 25 is a diagram illustrating a screen which is operated by the user and the maker;

FIG. 26 is a diagram illustrating a screen which is operated by the user and the maker;

FIG. 30 is a diagram illustrating the flow of operation of the planning management database;

FIG. 31 is a diagram illustrating a screen which is operated by the user and the maker;

FIG. 32 is a diagram illustrating a screen which is operated by the user and the maker; and FIG. 33 is a diagram illustrating a screen which is operated by the user and the maker.

DESCRIPTION OF THE EMBODIMENT

Hereafter, a description will be given of an embodiment of the invention. It should be noted that although in the following description maintenance information concerning power generating plants is used as a typical example, the invention can be similarly implemented for plant equipment other than the power generating plants.

Figure 1:
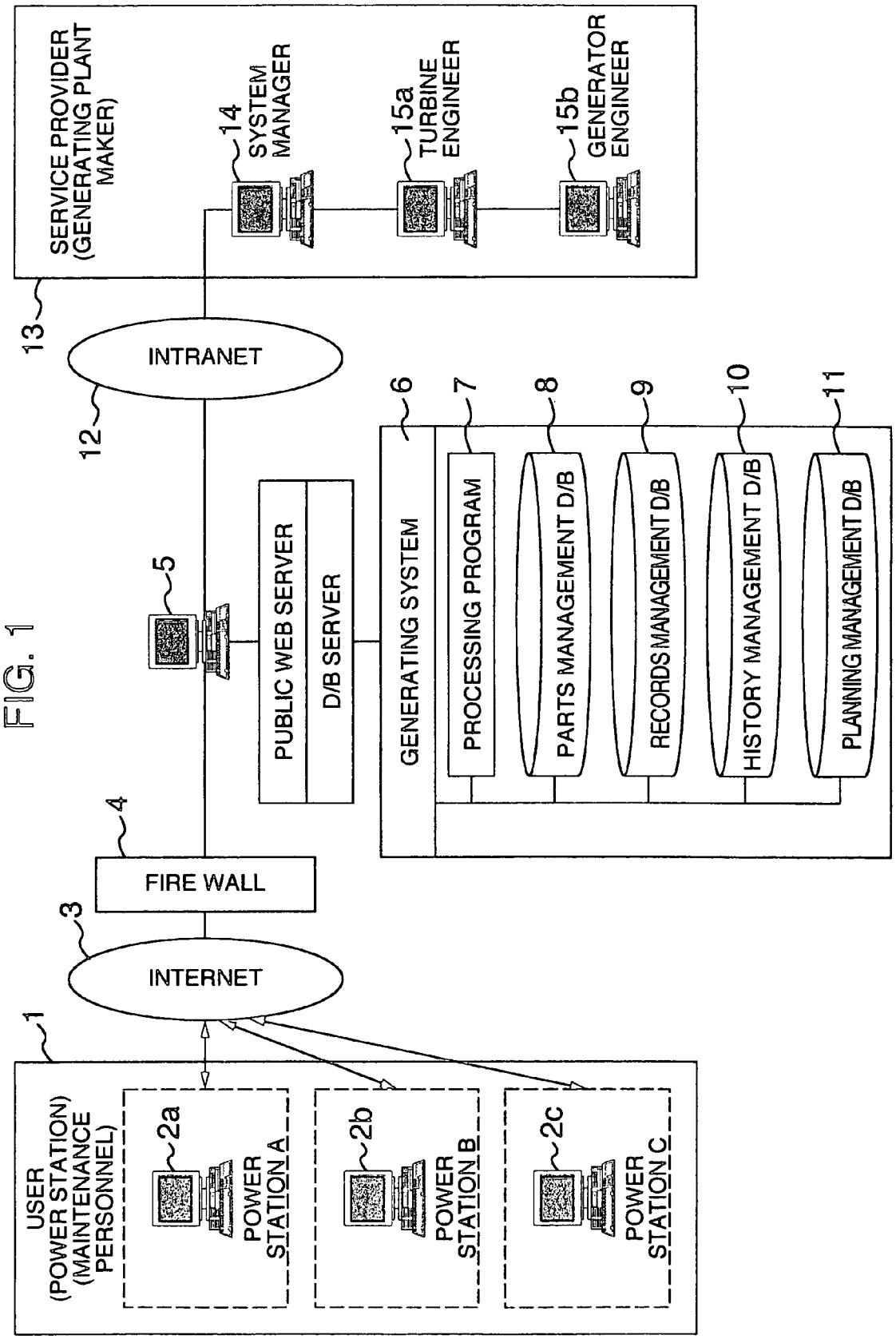
FIG. 1 is a diagram illustrating a generating plant maintenance management system in accordance with an embodiment of the invention.

FIG. 1 illustrates a schematic configuration of a generating plant maintenance management system using a communication network in accordance with an embodiment of the invention.

In this embodiment, in power stations A, B, and C on the user 1 side where power generating plants are installed, for example, a computer 2a is installed as a terminal apparatus used by maintenance personnel in the power station A, a computer 2b is installed as a terminal apparatus used by maintenance personnel in the power station B, and a computer 2c is similarly installed in the power station C. These computers 2a to 2c are in a state in which communication with the outside is possible by using a communication line, e.g., in an environment in which the Internet 3 can be used. Through the Internet 3 the user 1 accesses a Web server 5 for users set up by a service provider. A generating plant maintenance management system 6 which will be described later is built in this Web server 5, and a fire wall 4 for allowing access to the generating plant maintenance management system 6 from predetermined users and preventing unauthorized access from others is also installed in the Web server 5.

The generating plant maintenance management system 6 is configured by a processing program 7 for displaying a log-in screen and a menu screen and the like for starting the generating plant maintenance management system 6 and for fetching data, as well as a plurality of databases including a parts management database 8 which is a database concerning parts management information on a generating plant open to the public, a records management database 9, a history management database 10, and a planning management database 11.

A service provider 13 (a generating plant maker) provides an engineer in charge of analytical operations in the maker with inspection reports brought back by engineers dispatched from the maker when maintenance activities concerning the user's power generating plants were carried out, or maintenance information concerning the relevant power station. On the basis of the maker's knowhow and information registered in the generating plant maintenance management system 6, the engineer in charge conducts detailed analysis of the information including the submitted inspection reports and the like. At that time, the engineer in charge at the maker fetches the information registered in the generating plant maintenance management system 6 through a computer 15a for a turbine engineer and a computer 15b for a generator engineer, who are clients of an intranet 12.

The person in charge of turbines or generators registers through the intranet 12 the analyzed maintenance information in the various databases including the parts management database 8 to the planning management database 11 of the generating plant maintenance management system 6, and communicates with a system manager that the registration has been made. The system manager confirms through a computer 14 for a system manager that the data have been properly registered, and notifies the user through e-male or the like that the registration has been completed.

By using the computers 2a to 2c at the power stations through the Internet 3, the user reads the maintenance information registered in the various databases of the generating plant maintenance management system 6 and analyzed by the maker, or downloads the data into the computers 2a to 2c at the power stations, so as to make effective use of such information on the generating plant in the maintenance activities.

In addition, the user is able to contact the service provider 13 and provide necessary information for the future maintenance activities such as information on malfunctions which occurred during the operation of the power generating plants owned by the user. In turn, an engineer in charge in the service provider 13, e.g., a turbine engineer or a generator engineer, is able to register the provided information in the generating plant maintenance management system 6 on the maker side by using the computer 15a for the turbine engineer or the computer 15b for the generator engineer. Further, on the user side as well, the information can be registered in the various databases including the parts management database 8 to the planning management database 11 of the generating plant maintenance management system 6 by using any one of the computers 2a to 2c of the power stations through the Internet 3.

The maker registers not only the maintenance information provided by the user but also information requiring horizontal development due to malfunctions or the like occurring in other power generating plants in the various databases 8 to 11 of the generating plant maintenance management system 6, and notification that such information has been registered is given to the system manager. Through the computer 13 for the system manager the system manager confirms that the data have been properly registered, and notifies the user through e-male or the like that new information has been registered.

Figure 2:
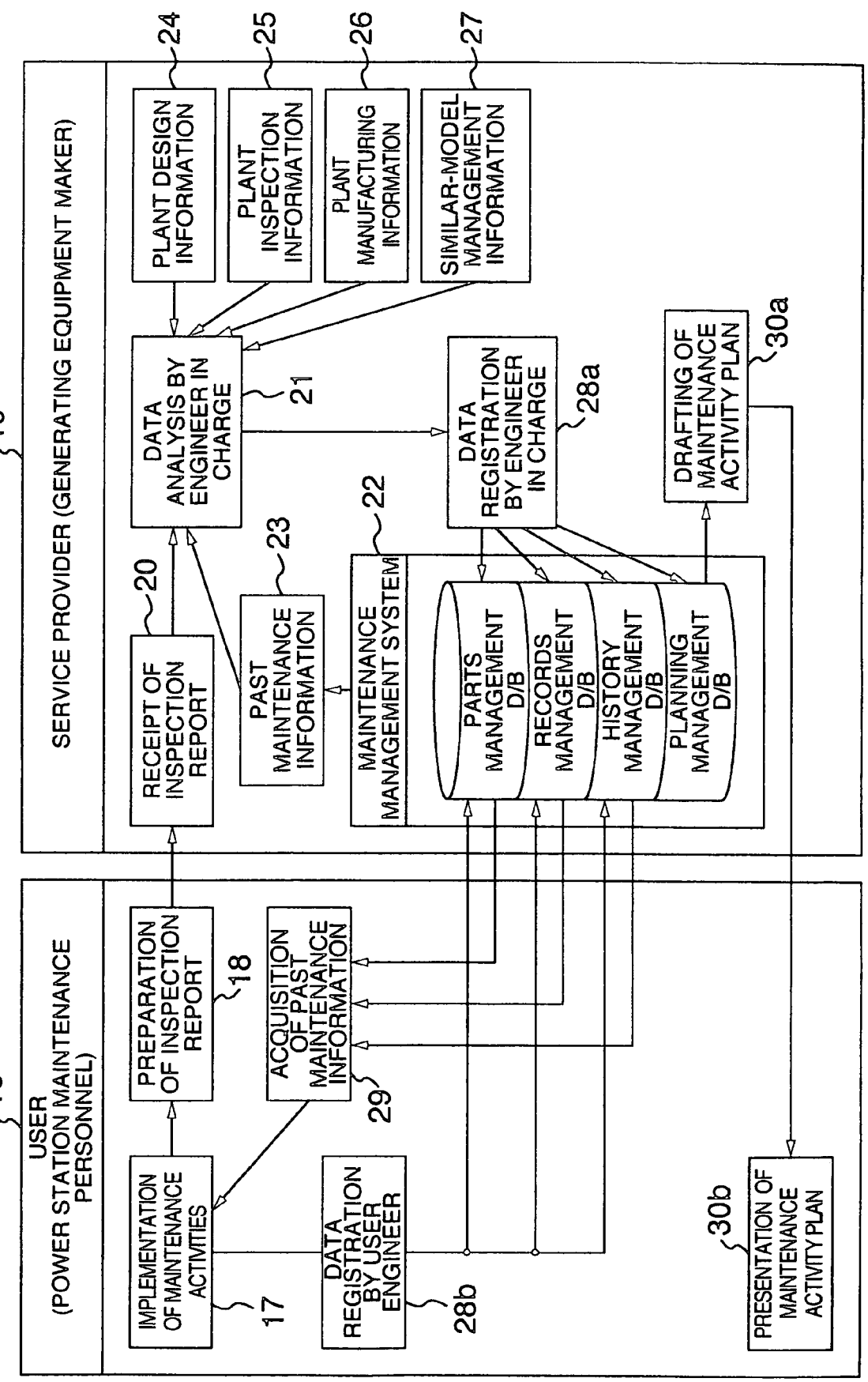
FIG. 2 is a diagram illustrating the flow of information in a case where this embodiment is used.

FIG. 2 shows the flow of maintenance information at a time when the user engages in maintenance activities by using the generating plant maintenance management system using the communication network in accordance with this embodiment, and the maker provides engineering support for the user's maintenance activities. In FIG. 2, by setting as a starting point the implementation 17 of maintenance activities by a user 16, an inspection report 18 is prepared in which the results of the inspection implemented by the user are written, and this inspection report is sent to a maker 19 who is a service provider. The maker receives 20 the inspection report, and an engineer in charge analyzes 21 the data in the inspection report. At this time, the engineer in charge effects the analysis of the information while making use of past maintenance information 23 on the relevant generating plant which is registered in a maintenance management system 22 and stored in, for example, the parts management database, the records management database, the history management database, and the planning management database, as well as design information 24, inspection information 25, manufacturing information 26, and similar-model maintenance information 27 concerning the relevant generating plant, which are possessed by the maker. The analyzed information is registered 28a in the maintenance management system 22 by the engineer in charge.

Further, the user engineer is also able to register 28b the data in the databases of the maintenance management system 22. The user 16 accesses the maintenance management system 22 through the communication network, and during the implementation of the maintenance activities acquires 29 the past maintenance information being managed in the maintenance management system 22, or makes effective use of the past information in the drafting 30a of a plan for ensuing maintenance activities. The details of the planned maintenance activities are presented 30b to the user.

Figure 3:
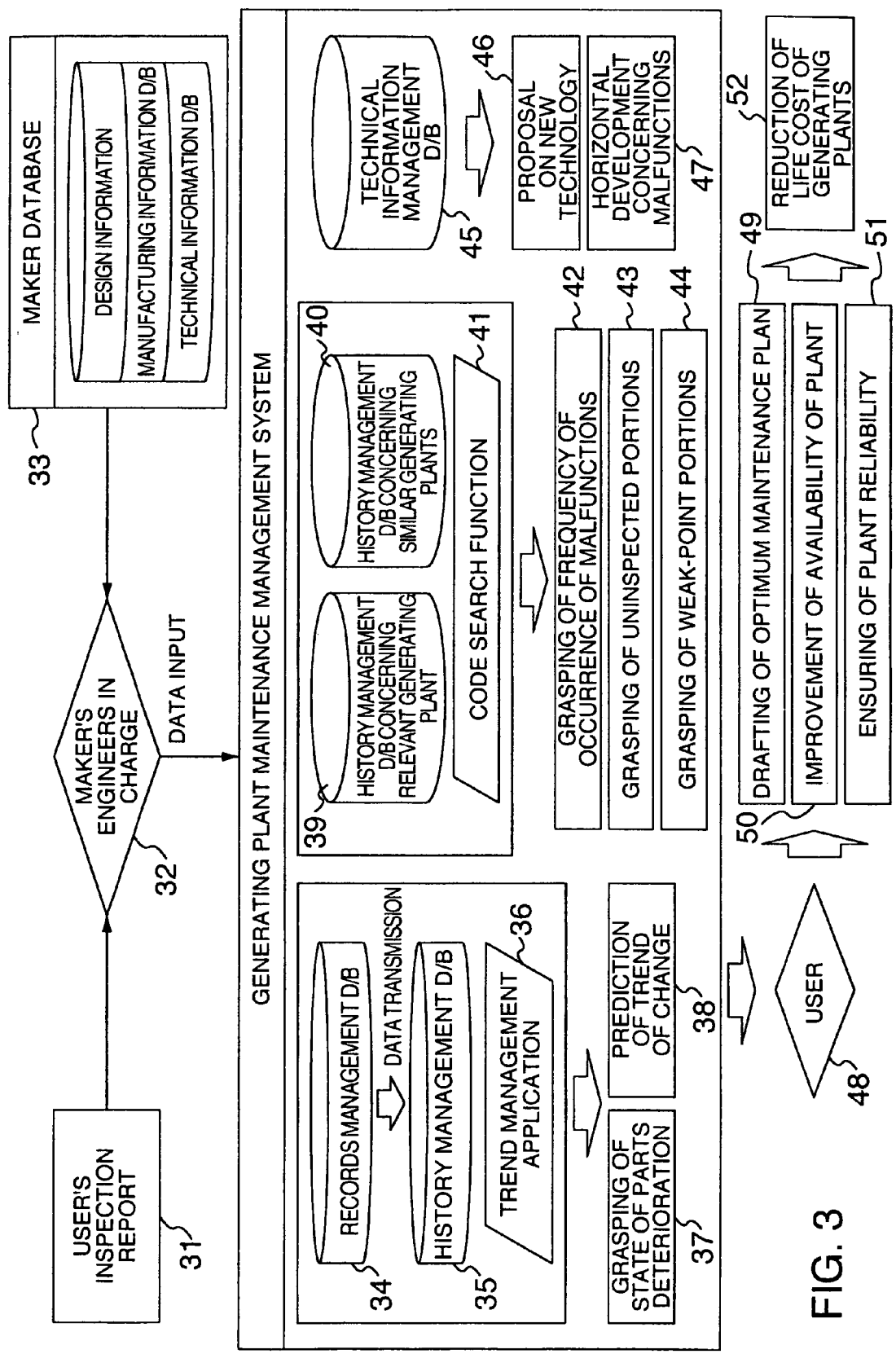
FIG. 3 is a diagram illustrating a specific method of implementation of the generating plant maintenance management system which is implemented by a maker.

FIG. 3 shows specific technical contents at a time when the maker analyzes the maintenance activities to be provided to the user, and registers them in this system in accordance with the embodiment. After an engineer 32 in charge of each plant enters in the maintenance management system an inspection report 31 in which the results of maintenance activities concerning the generating plant carried out by the user are rearranged, the maker predicts the occurrence of malfunctions and the like and extract uninspected portions and weak-point portions by utilizing the past maintenance information on the relevant generating plant already registered and the information on similar generating plants possessed by other users. By incorporating information from a maker database 33, in which design information, technical information, and so on concerning each plant possessed by the maker have been registered, into the aforementioned items of information, the maker provides a guideline for optimum maintenance activities to the relevant generating plant.

Next, illustration will be given of an example of support for maintenance activities which is provided by the maker to the user by using the maintenance management system.

The data of the inspection reports registered in a records management database 34 of this system are automatically transmitted to and stored in a history management database. Then, the trend of deterioration of the plant from the past to the present is grasped 37 by a trend management application 36 in the history management database, and a prediction 38 of the trend of future change calculated from its rate of change is made so as to automatically calculate inspection at an optimum timing or the period of replacing component parts. Information on that prediction is presented to the user.

In addition, information on various phenomena of malfunctions which occurred in the past are registered in the history management database 35. By using a code search function 41, the engineer in charge of the maker is able to search similar past cases from a history database 39 concerning the relevant generating plant or similar cases from a history database 40 concerning similar generating plants. As a result, it is possible to confirm in a short time the phenomena of malfunctions equivalent to the malfunctions which occurred, their causes and countermeasures, and by grasping the frequency 42 of the occurrence of equivalent malfunctions and incorporating the maker's technical views, it is possible to accurately supply necessary information with respect to the detected malfunction to a user 48. Consequently, the user is able to minimize the period of shutdown.

Further, by using the history management database 35, it is possible to easily search uninspected portions 43 and weak-point portions 44 of the respective plants, and by using a technical information management database 45, it is possible to easily extract a proposal 46 on a new technology which has already been presented to the user, horizontal development information 47 on malfunctions which occurred in other generating plants, and so on. Hence, it is possible to accurately supply information required when the user 48 drafts a maintenance plan. As compared with the conventional method in which the user collects various maintenance information and drafts a maintenance plan, it is possible to reduce the time required for planning, and careful drafting 49 of a maintenance plan becomes possible.

As described above, as the maker provides various maintenance information to the user, the user is able to improve 50 the availability factor of the plants, ensure 51 high reliability, and reduce 52 the life cost of the generating plants.

Figure 4:
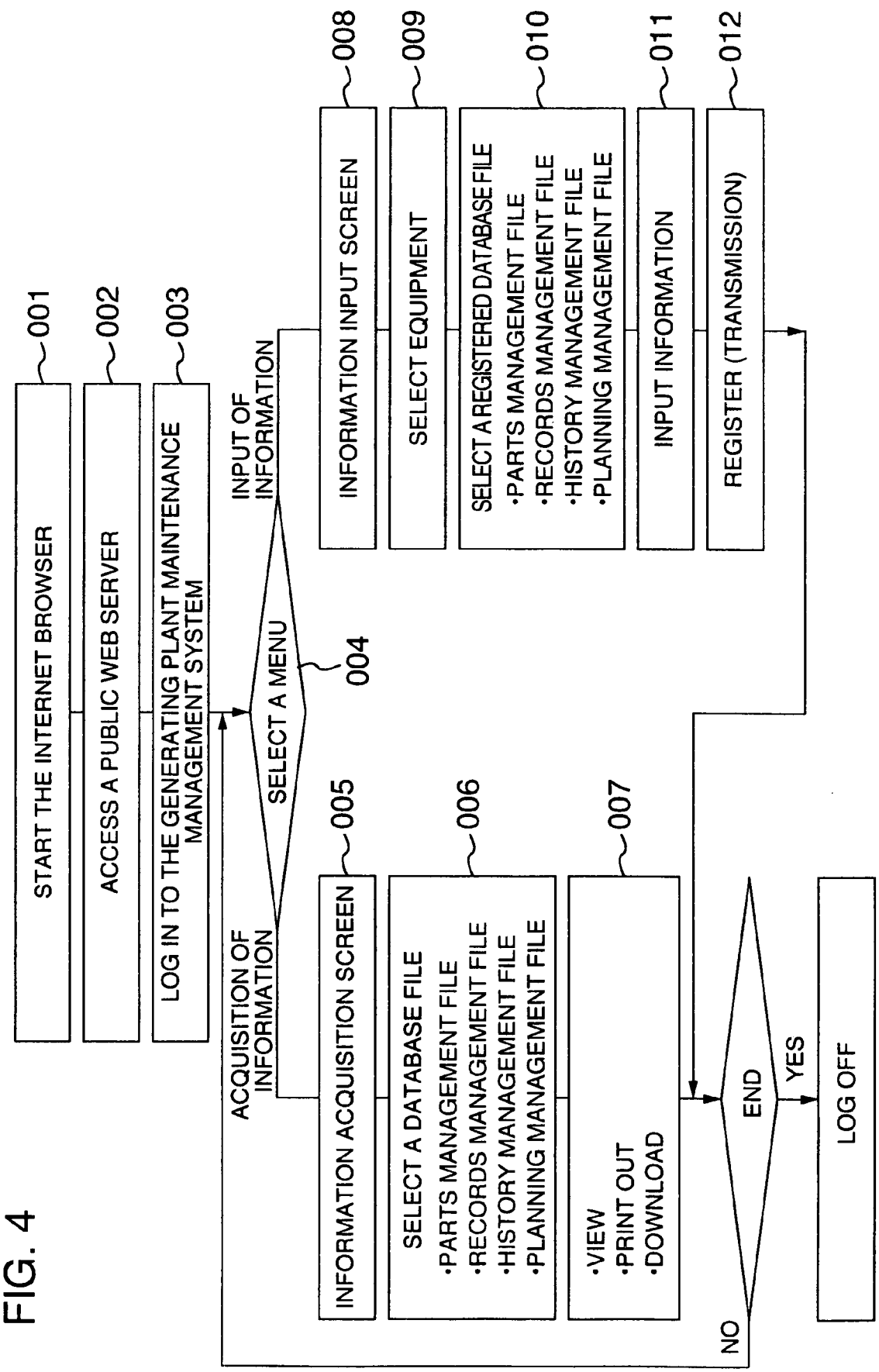
FIG. 4 is a diagram illustrating the flow of obtaining and inputting information in the generating plant maintenance management system.

FIG. 4 shows specific processing procedures in a case where the user obtains or inputs maintenance information by using the generating plant maintenance management system 6. Namely, FIG. 4 describes the details of the processing program 7 shown in FIG. 1.

The user starts an Internet browser (Step 001), accesses a designated Web server (Step 002), and logs in to the generating plant maintenance management system (Step 003). Next, a processing menu is selected (Step 004), and in a case where maintenance information is to be obtained, an information acquisition screen is opened (Step 005), and a database file in which information to be obtained concerning such as parts, records, history, and maintenance plans is stored is opened (Step 006). From the opened database file, the information is read, printed out, or downloaded into the user's personal computer, as required (Step 007).

When maintenance information is inputted by the user, the user opens an information input screen (Step 008) at the time of selecting the processing menu (Step 004), selects the name of equipment subject to input (Step 009), and opens a registered database file in which information to be inputted concerning such as parts, records, history, or maintenance plans is stored (Step 010). The user inputs information in the opened registration database file (Step 011). The inputted data is registered in the database (Step 012). Thus the data inputted by the user is registered through the internet in the generating plant maintenance management system managed by the maker.

In addition, in a case where the user registers maintenance information, the maintenance information is registered in steps similar to the aforementioned steps for the registration of the maintenance information by the user.

Figure 5:
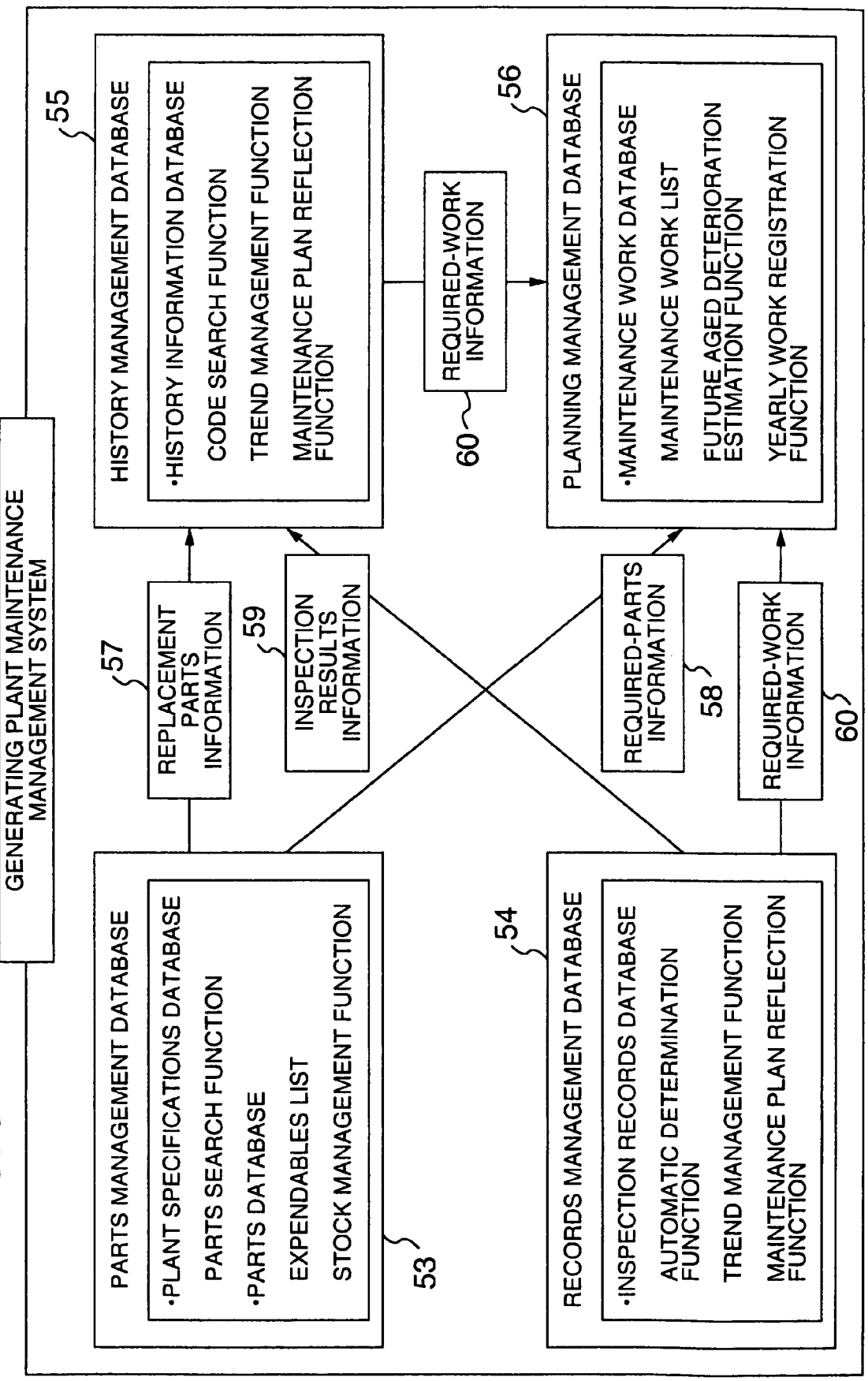
FIG. 5 is a diagram illustrating the link of information within the generating plant maintenance management system.

FIG. 5 shows the configuration of the generating plant maintenance management system which is applied to this embodiment, as well as the flow and link of information. The generating plant maintenance management system is comprised of four databases including a parts management database 53, a records management database 54, a history management database 55, and a planning management database 56, which are linked to each other, whereby the information is provided to a related database. For example, parts used in the maintenance activities are managed by a stock management function provided in the parts management database, replacement parts information 57 is transmitted to the history management database 55, and required-parts information 58 is transmitted to the planning management database 56. In addition, as the results of inspection are entered and registered as a record in the records management database 54, inspection results information 59 is automatically registered in the history management database 55. Further, information which is determined to require inspection or parts replacement is registered in a maintenance work list of the planning management database 56 as required-work information 60 by trend management functions of the records management database 54 and the history management database 55. As the maintenance information is thus linked to each other, information can be effectively utilized.

Hereafter, referring to diagrams on the system flow and display screens of the generating plant maintenance management system in FIGS. 6 to 33, a description will be given of various functions, the method of use by the user, and the method of providing engineering support to the user by the maker.

Figure 6:
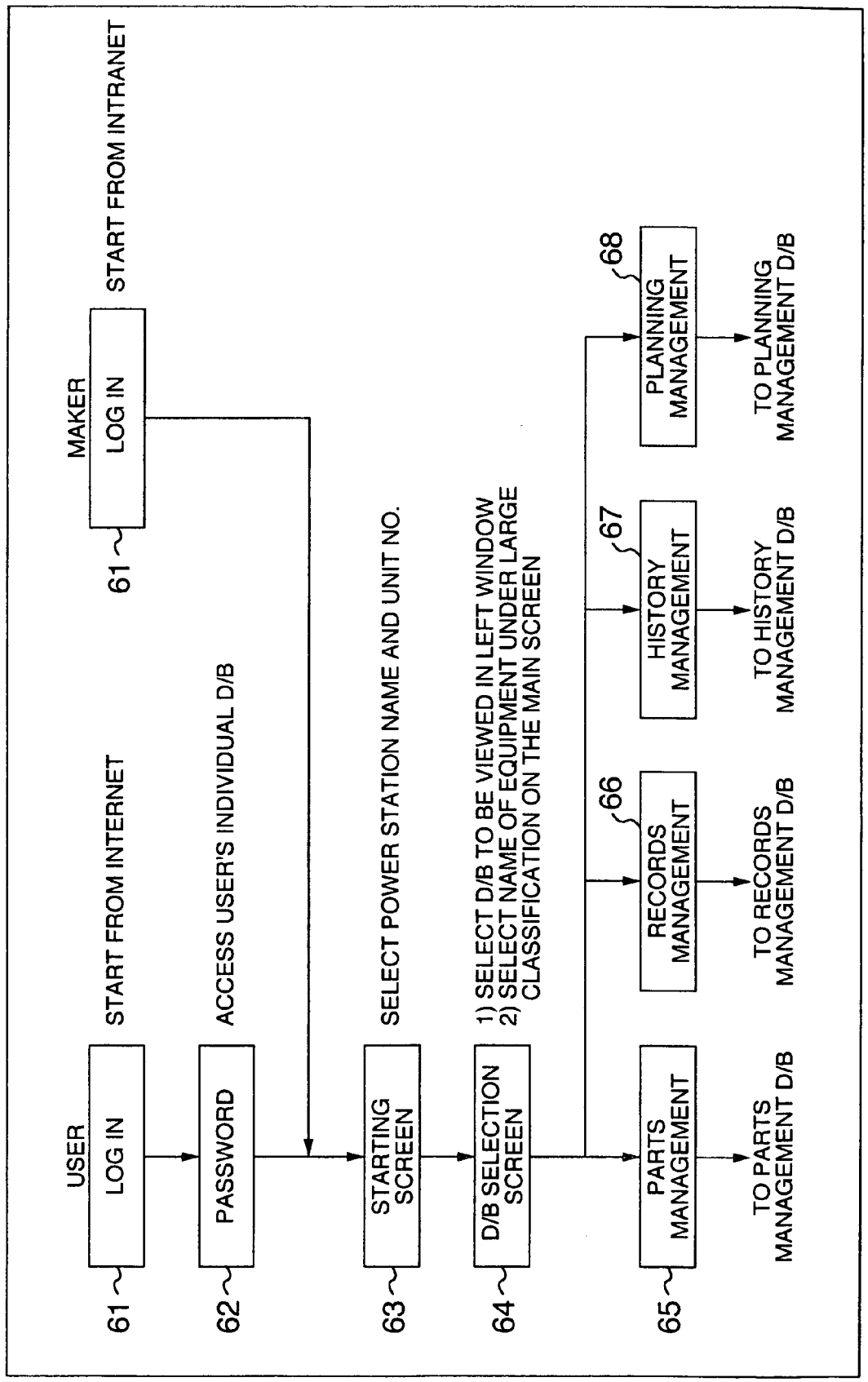
FIG. 6 is a diagram illustrating the flow of operation for accessing each database from a Web server.

FIG. 6 shows the flow from the time the user or the maker in an example of practical application accesses the Web server and logs in until the user or the maker accesses each database. As also shown in FIG. 4, the user starts the Internet browser and accesses the Web server. To open the server, the user logs in 61, and inputs a password 62 possessed by an individual user. On the other hand, the maker logs in 61 to the system through an intranet. As a result, the system is started, and a start screen 63 is displayed, and if the name of the power station and a unit number are inputted, it is possible to proceed to a database selection screen 64. On this database selection screen, one of the four database names including parts management 65, records management 66, history management 67, and planning management 68 is selected, and it is then possible to proceed to the database.

FIG. 7 shows an example of practical application of the start screen 63 of the system. In the window in the lower portion of the screen, a power station name 69 and a unit number 70, which are selected from pulldown menus of the power station name and the unit number, are entered.

Figure 8:
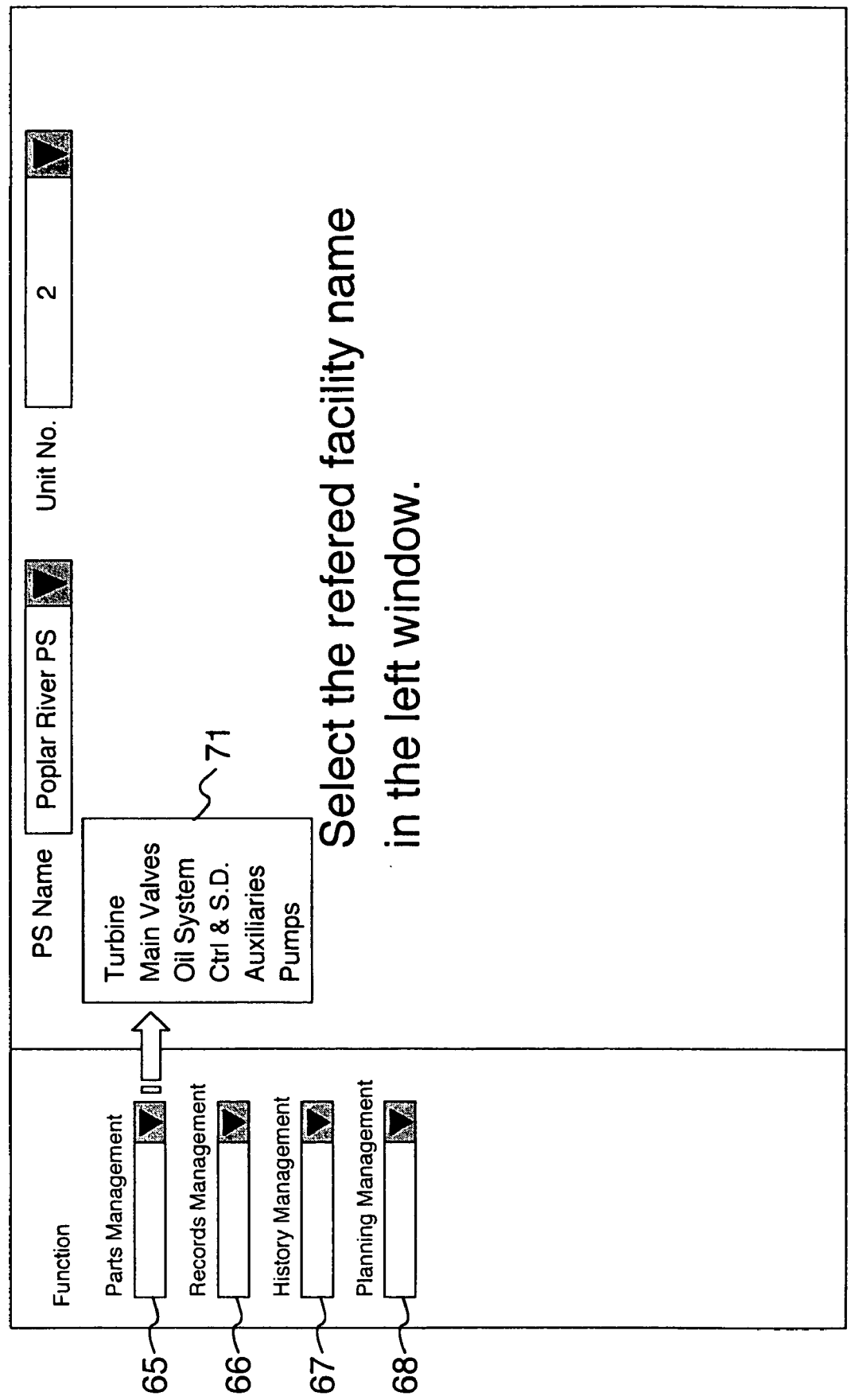
FIG. 8 is a diagram illustrating a screen which is operated by the user and the maker.

FIG. 8 shows an example of practical application of the database selection screen 64. The four database names of the parts management 65, the records management 66, the history management 67, and the planning management 68 are shown in the left window of this screen, and an item to be accessed is selected from among them. If the database name is selected, equipment names 71 under large classification located in its lower layer are displayed in a pulldown menu, and if one equipment name is selected, it is possible to proceed to each database.

Next, a description will be given of the flow and the respective screen configuration after the access to each database. First, the flow of the database of the parts management 65 is shown in FIG. 9.

Figure 9:
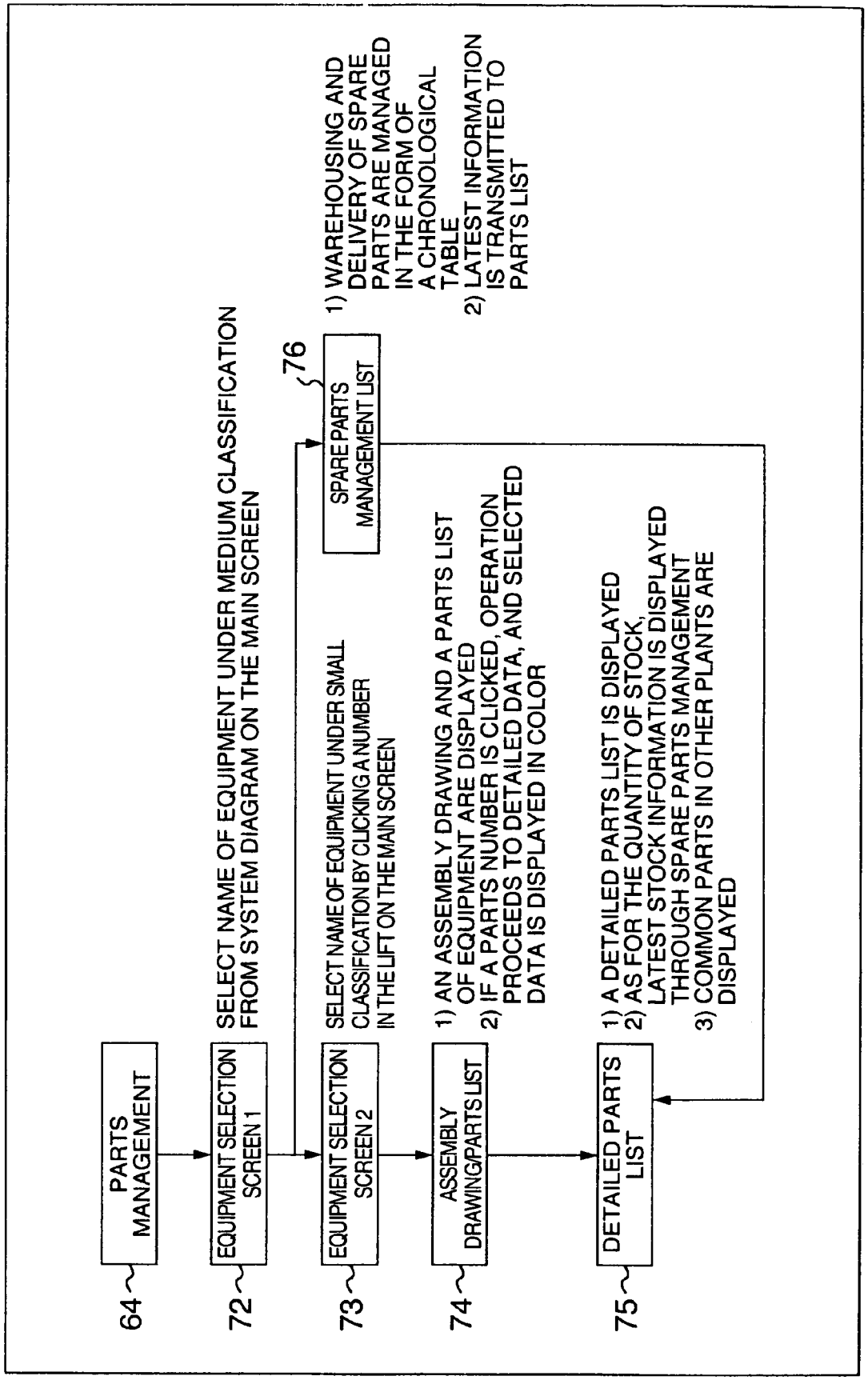
FIG. 9 is a diagram illustrating the flow of operation of a parts management database.

In FIG. 9, if one of the equipment under large classification in the parts management database is selected, an equipment selection screen 1 (72) is displayed. Here, the arrangement provided is such that equipment under medium classification can be selected from a system diagram. Next, if one of the equipment under medium classification is selected, an equipment selection screen 2 (73) is displayed to allow equipment under small classification to be selected. In the parts management, an assembly drawing/parts list 74 of equipment under small classification and its detailed parts list 75 can be viewed, and necessary information can be extracted or downloaded into the individual personal computer. Further, the quantities of parts in stock shown in the detailed parts list 75 show the latest information of the data managed by a spare parts management list 76.

Figure 10:
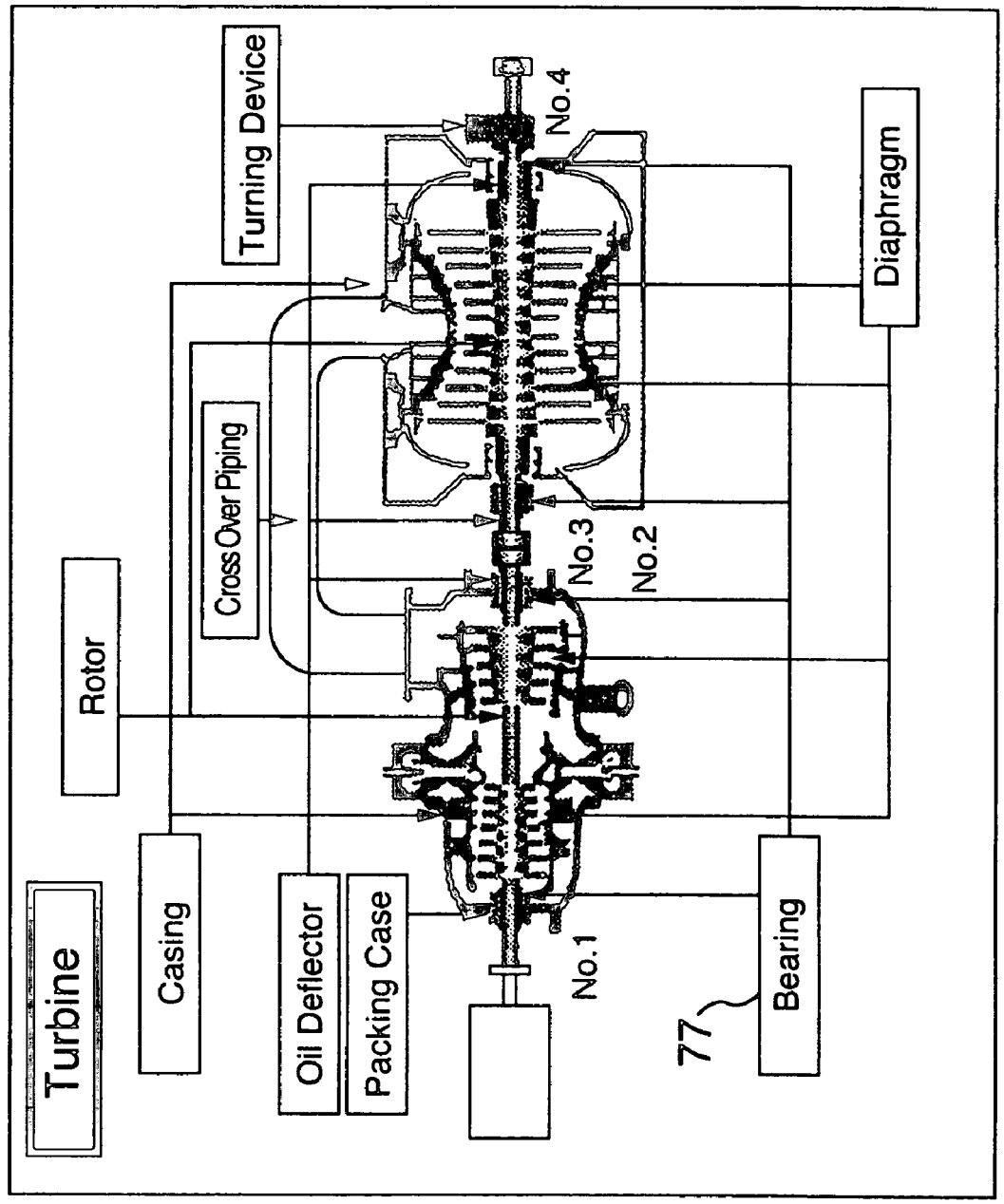
FIG. 10 is a diagram illustrating a screen which is operated by the user and the maker.

FIG. 10 shows an example of practical application of the equipment selection screen 1 (72). If one of equipment name buttons 77 under medium classification to be viewed is clicked in the system diagram on the screen, it is possible to proceed to a selection screen for selecting equipment under small classification concerning that equipment.

Figure 11:
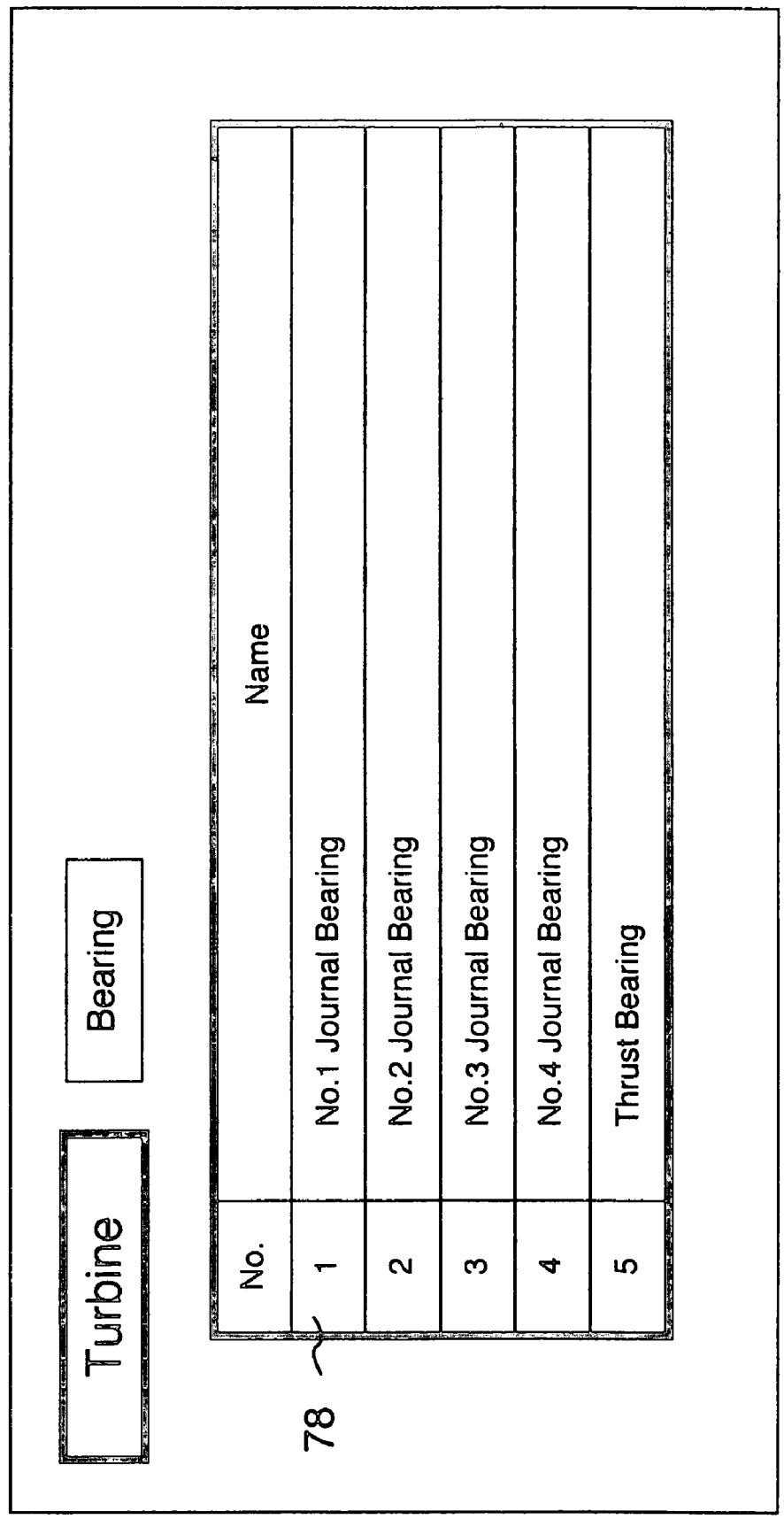
FIG. 11 is a diagram illustrating a screen which is operated by the user and the maker.

FIG. 11 shows an example of practical application of the equipment selection screen 2 (73). If one of name numbers 78 of equipment under small classification to be viewed is clicked in the list on the screen, it is possible to access parts management information concerning that equipment.

Figure 12:
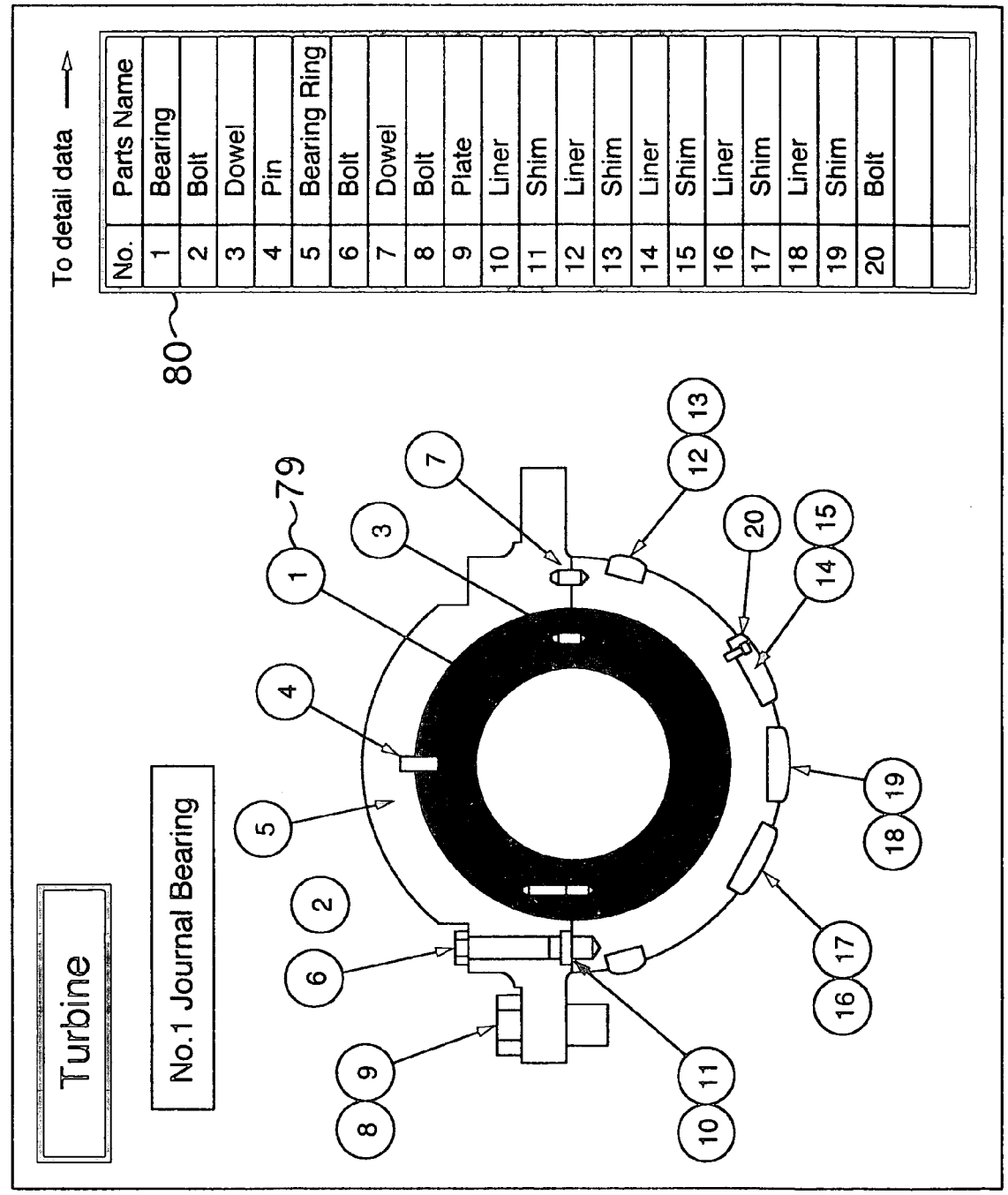
FIG. 12 is a diagram illustrating a screen which is operated by the user and the maker.

In the parts management information, an assembly drawing or a cross-sectional view of the equipment is displayed in FIG. 12, whereby it is possible to confirm the configuration of the parts of the equipment and parts names. If it is desirous to obtain detailed information on the respective parts, one of parts numbers 79 in the assembly drawing or the cross-sectional view or one of parts numbers 80 in the parts list is clicked.

FIG. 13 shows an example practical application of detailed information 81 on parts. The part selected on the previous screen is displayed by being differentiated in color 82 from other parts. As for a stock column 83 on this screen, the latest information is displayed by a parts stock management database which will be described later, so that the user or the maker is able to confirm the stock of parts of the equipment for which maintenance activities are to be implemented in the future, and the user is able to confirm the need for placing an order for necessary parts with the maker. In addition, the maker is able to recommend parts necessary for the future maintenance activities. (Stock management is conventionally carried out on the user side, and there have been cases where a shortage of parts is confirmed immediately before or during the implementation of the maintenance activities, possibly causing a delay or prolongation of the maintenance activities.)

FIG. 14 shows an example of practical application of the parts stock management database. A parts warehousing/delivery management list 84 is implemented by this database and makes it possible to confirm the parts which have been ordered and used by year as well as the present quantities of the stock.

Figure 15:
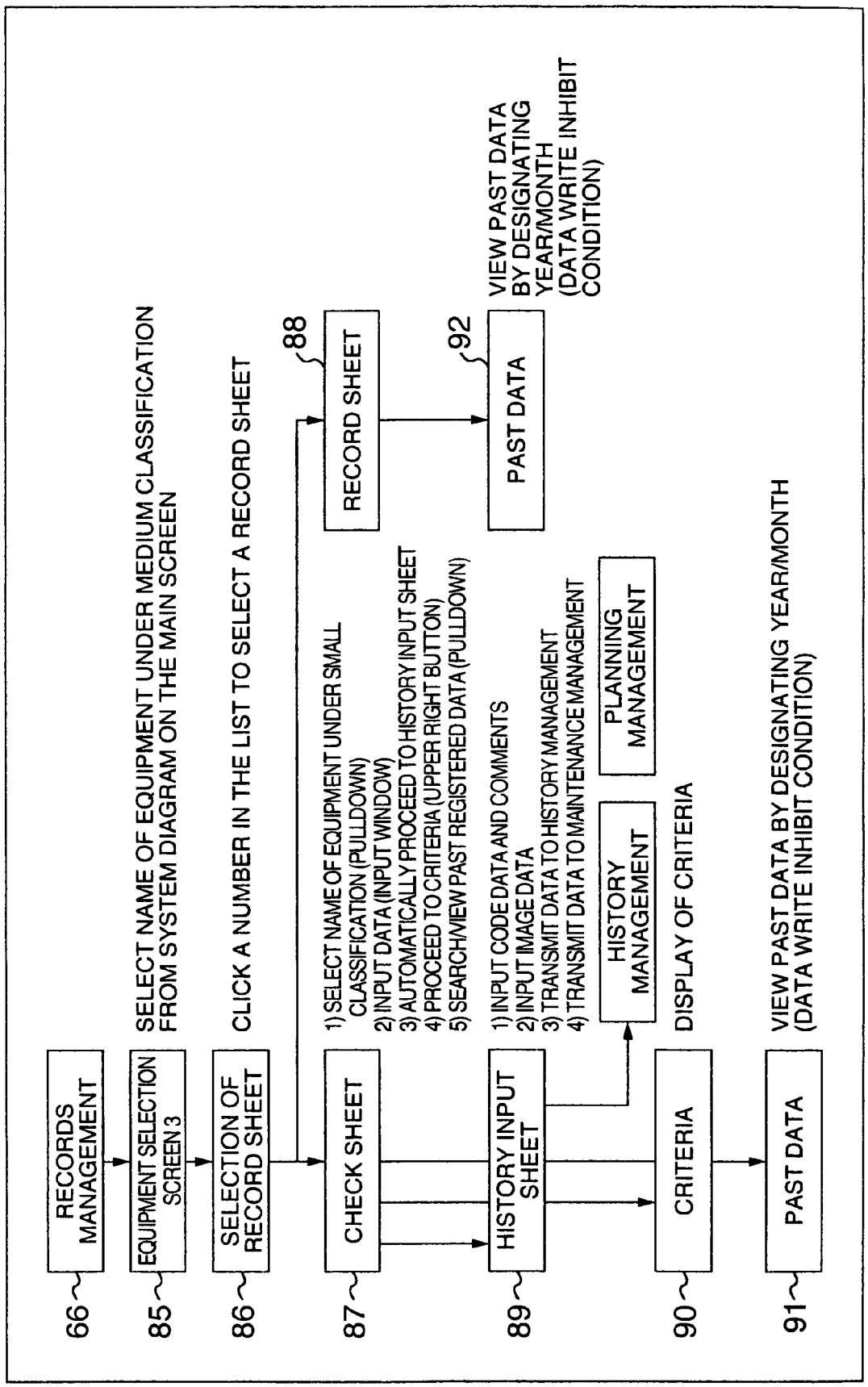
FIG. 15 is a diagram illustrating the flow of operation of a records management database.

Next, FIG. 15 shows the flow in the case of accessing the records management database. If the records management 66 is accessed after selecting equipment under large classification in the flow described with reference to FIG. 6, an equipment selection screen 3 (85) similar to FIG. 8 concerning the parts management is displayed to allow the name of equipment under medium classification to be selected. If the equipment name is selected, the screen proceeds to a record sheet selection screen 86 displaying the names of record sheets concerning the relevant equipment, and a record to be inputted in or viewed can be selected from this screen.

Record sheets are largely classified into check sheets 87 and record sheets 88. The check sheets 87 are provided to grasp the contents of the overall activities carried out for the relevant equipment during the maintenance activities. During inputting, the presence or absence of the implementation of detailed items of work, their results, and whether the results were satisfactory or unsatisfactory are entered. When the data are entered for the respective detailed items of work, a history input sheet is automatically displayed. Detailed information on the maintenance activities, photographs taken or sketches drawn during the maintenance activities, and the like can be stored in this sheet. This data is automatically sent to the history management database as history management information which will be described later, and as for the items to be reflected on the future maintenance activities, it is possible to allow information to flow to a maintenance plan. In addition, when making an entry in the check sheet or viewing it, in a case where the criteria is to be confirmed, it is possible to proceed to criteria 90 by clicking a criteria button. Further, in a case where the results of the past maintenance activities are to be viewed, data to be viewed can be selected from a pulldown menu displaying the year/month of implementation of activities on the screen, thereby allowing past data 91 to be viewed freely. However, the past data 91 is softwarewise locked to prevent input to or correction of the past data.

In addition, the record sheet 88 is used for inputting and storing inspected and measured data in the maintenance activities. The data inputted in this record sheet 88 is linked so that it can be utilized as trend management data in history management which will be described later. Further, when past data 92 is to be viewed, viewing is possible in a procedure similar to that for the check sheet.

FIG. 16 shows an example of practical application of the record sheet selection screen 86. If a number 93 on the screen is clicked, it is possible to proceed to a record sheet to be inputted in or viewed.

FIG. 17 shows an example of practical application of the check sheet 87 for equipment maintenance activities. Here, a list of items 94 of maintenance activities to be implemented in the maintenance activities is shown, and the presence or absence 95 of implementation of the detailed items of work, their results 96, and whether the results were satisfactory or unsatisfactory 97 are entered. As a result, it is possible to enter or view the results of maintenance activities concerning the respective equipment. When the results of the maintenance activities are entered, the results can be automatically registered in the history management database which will be described later.

FIG. 18 shows a history input sheet for registering maintenance data in the history management database. This sheet is provided for each detailed item of work of the aforementioned check sheet, and when the input of data in the check sheet is completed, the sheet is automatically displayed. During the input in the history input sheet, input is automatically made in a unit number 98 and the name 99 of equipment under medium classification which have already been set. In addition, input is also automatically made in a year/month 100 of implementation of inspection, the equipment name 101 under small classification, parts name 102, work/inspection name 103. If the results of inspection are satisfactory, no input is made in phenomena 104, cause 105, and countermeasure 106, and a display is given in a comments column 107 that there is no abnormality. If an inputter desires to add comments or input a bit-map file 108 such as a photograph or a related record 109, registration is made by inputting its file name. If the results were unsatisfactory, the data inputter is able to input in the phenomena 104, the cause 105, and the countermeasure 106 by selecting from their pulldown menus, and also inputs in the comments column 107, the bit-map file 108 such as a photograph, and the related record 109. These items of information are registered as the history data. In addition, if the results are those of items to be implemented on a continuous basis in the future maintenance activities, the data can be also registered in the maintenance plan by clicking a reflection button 110.

In addition, during the entry in or viewing of the check sheet 87 for equipment maintenance activities shown in FIG. 17, when it is desirous to confirm the criteria 90 of design values, management values, and the like with respect to these results of the maintenance activities, if an access button 111 for accessing a management value list at upper right in the screen in FIG. 17 is clicked, it is possible to access a management value list 112 shown in FIG. 19.

Further, in FIG. 17, when it is desirous to view the results of the past maintenance activities, it is possible to do so by selecting the year/month of implementation from a registered data column 113 at upper right on the screen.

Figure 20:
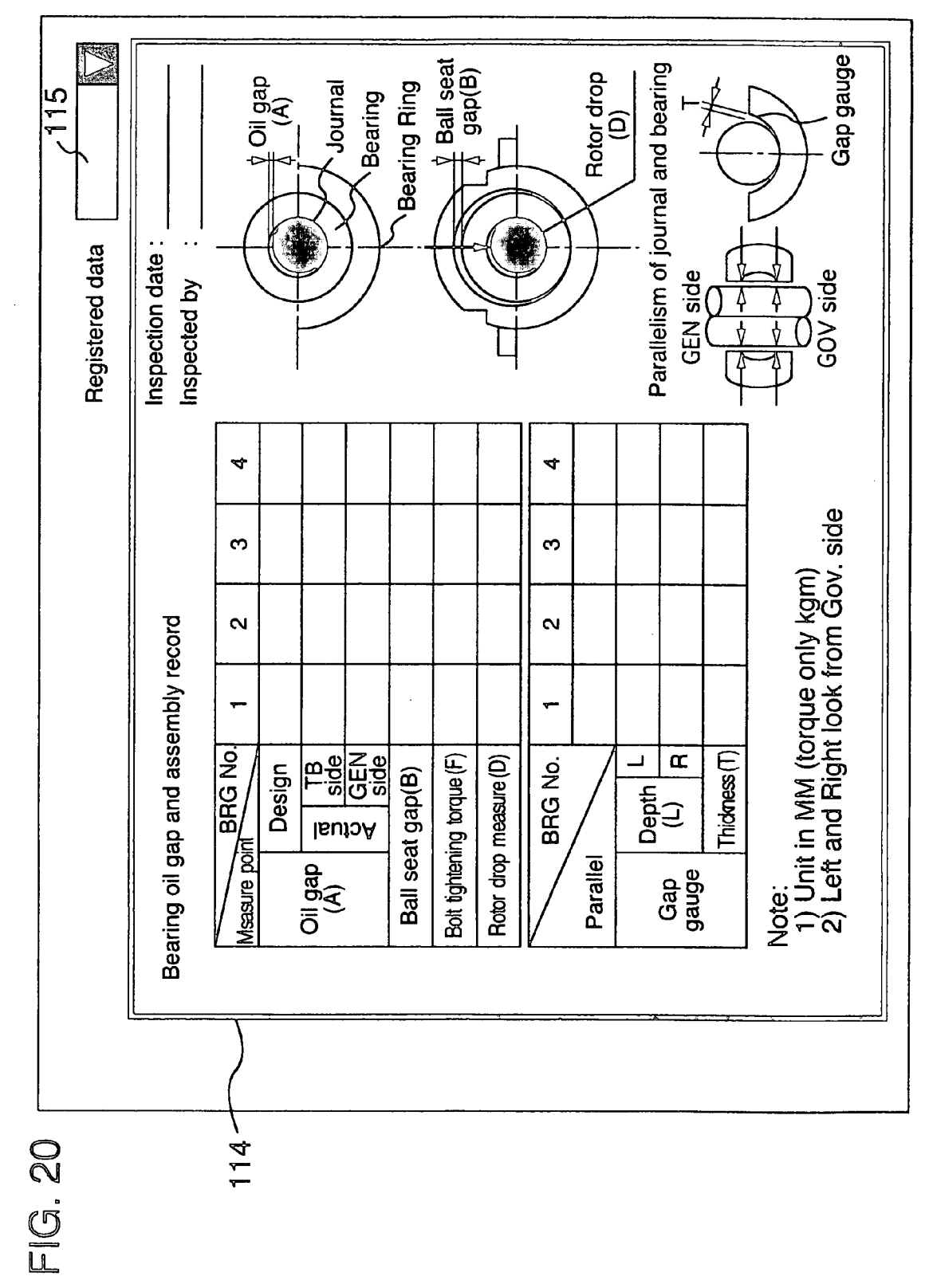

When entering the results of individual maintenance activities in a predetermined record sheet or viewing them, the name of the record sheet for inputting or viewing is selected in FIG. 16. FIG. 20 is one example of the record sheet. The results of inspection are entered in a record input sheet 114. Here again, in a case where the results of past maintenance activities are to be viewed, viewing is possible by selecting the year/month of implementation of activities in a registered data column 115 at upper right on the screen.

The data registered in FIG. 20 are stored as a record of maintenance activities in the database, and are also utilized as information on trend management in the history management database. A detailed description will be given of this information in the item on trend management.

Figure 21:
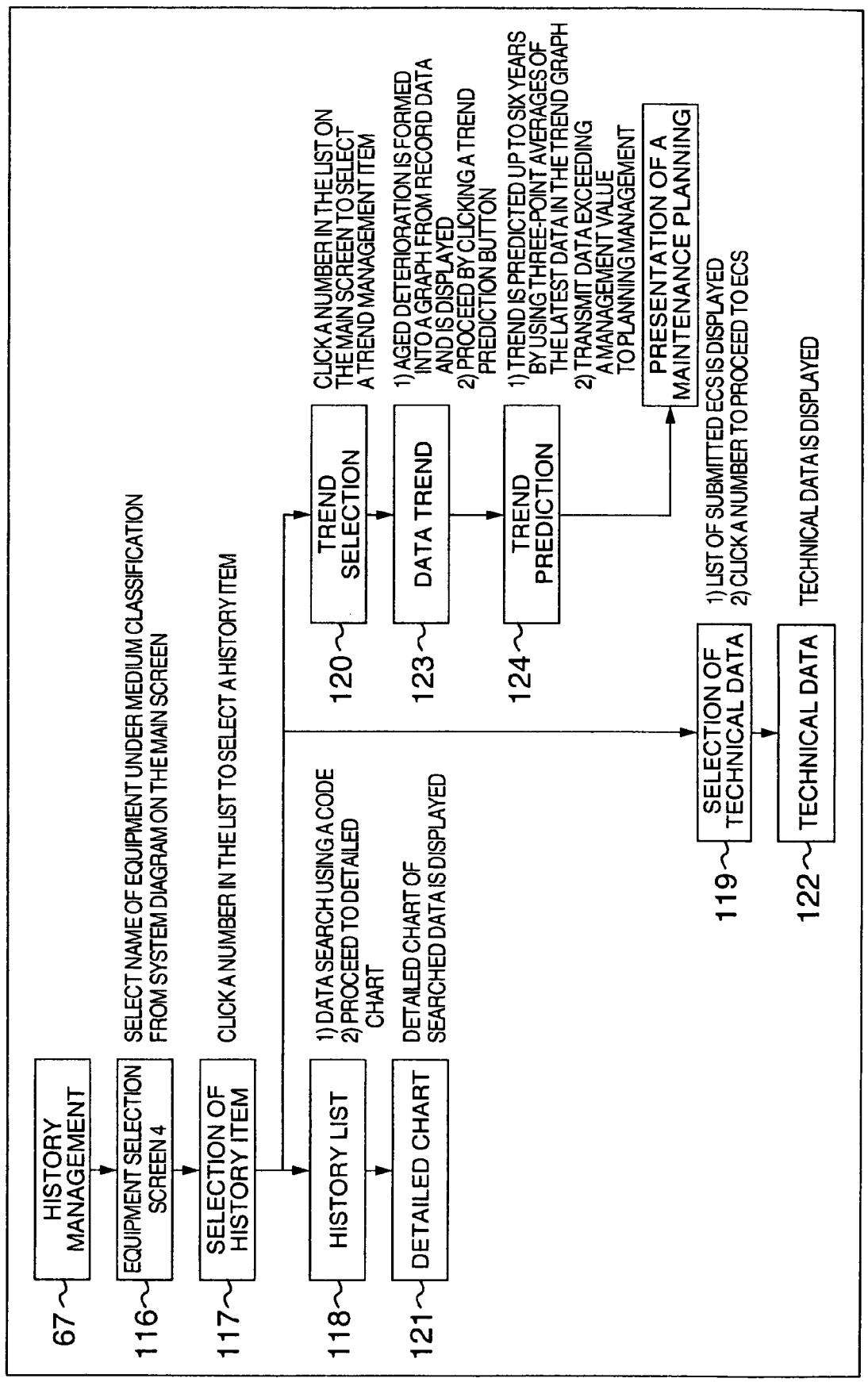
FIG. 21 is a diagram illustrating the flow of operation of a history management database.

Next, the flow in the case of accessing the history management database is shown in FIG. 21. If the history management 67 is accessed after selecting equipment under large classification in the flow described with reference to FIG. 6, an equipment selection screen 4 (117) is displayed to allow the name of equipment under medium classification to be selected.

When the system diagram of the selected equipment is displayed, and the name of the equipment is selected, the operation proceeds to the history item selection screen 117 concerning the relevant equipment. From this screen, a history item to be viewed is selected. Here, the equipment is not classified into small groups of classification in the manner of the parts management and the records management, and the operation proceeds to a screen to be viewed by using the history management menu. The reason for this is that there are items of maintenance information which are related to each other among the medium groups of classification.

The history items include history list selection 118, technical data 119, and data trend selection 120, a search code corresponding to each equipment is related to the history list selection 118, and search is possible by designating a code, so that it is possible to proceed to a detailed chart 121 of the registered data. In the technical data selection 119 as well, a list is displayed, and it is possible to proceed to individual technical data 122 from its number. If the trend selection 120 is selected, a trend graph 123 on the item being managed is displayed, and by clicking a trend prediction button on the graph screen, a graph of trend prediction 124 is displayed.

FIG. 22 shows an example of practical application of the history item selection screen 117. If a number 125 in the list on the screen is clicked, it is possible to proceed to the history list 118, the technical data 119, and the data trend 120.

Figure 23:
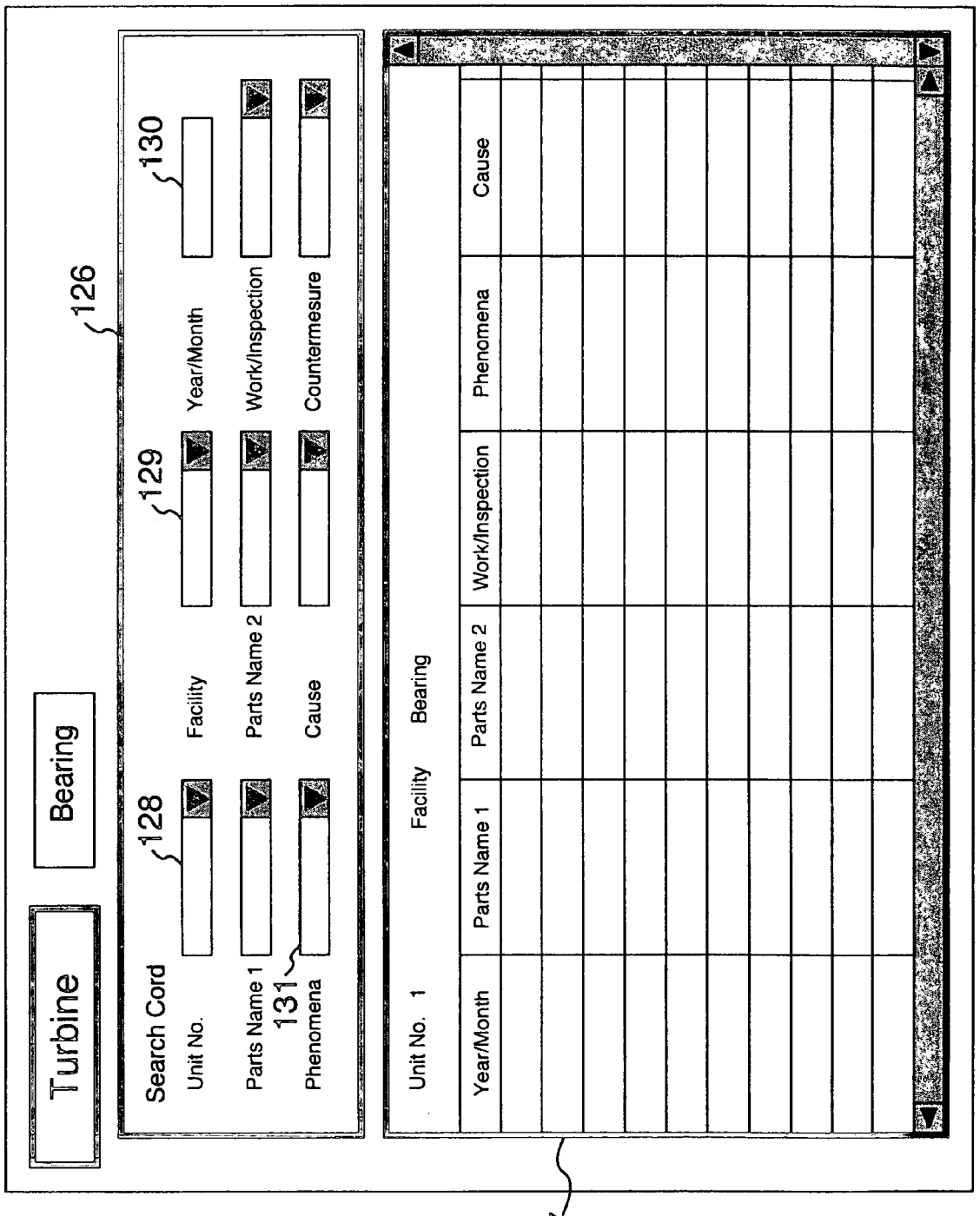
FIG. 23 is a diagram illustrating a screen which is operated by the user and the maker.

FIG. 23 shows an example of practical application of the history list 118. A column 126 for designating a code for search is provided in an upper portion of the screen, and if an item to be confirmed is code-searched, the user or the maker is able to view a history list 127.

For example, in a case where the user or the maker desires to know what inspection was performed during the previous maintenance activities with respect to the designated equipment and what were the results, viewing is possible if search is made by selecting a unit name 128, a facility name 129, and year/month 130 from their pulldown menus. Alternatively, if it is desirous to know the frequency of occurrence of a certain phenomenon, chronologically arranged information can be viewed if search is made by selecting the facility name 129 and a phenomenon code 131 from their pulldown menus.

Further, when it is desirous to view the detailed chart 122 registered in the history list 127, if an item to be confirmed in the history list 127 is clicked, it is possible to proceed to the detailed chart screen shown in FIG. 24, and view detailed data, photographs, and the like.

Consequently, when drafting a maintenance plan, the user is able to reflect an item to be implemented on future maintenance activities on the basis of the actual results of the past. Meanwhile, the maker is able to compare items of information on a plurality of generating plants being managed by this system, so that the maker is able to easily present a proposal for more reliable maintenance activities to the user.

FIG. 25 shows an example of practical application of a list screen when it is desirous to access technical data. Here again, it is possible to select an item to be viewed by using a code search column 132, and the results of search are displayed in a list 133. Further, if an item is clicked, the details of the technical data can be viewed.

Next, a description will be given of access to trend management. FIG. 26 shows an example of practical application of a menu screen of data trend. If a number 134 in the menu is clicked, it is possible to proceed to a trend graph.

Figure 27:
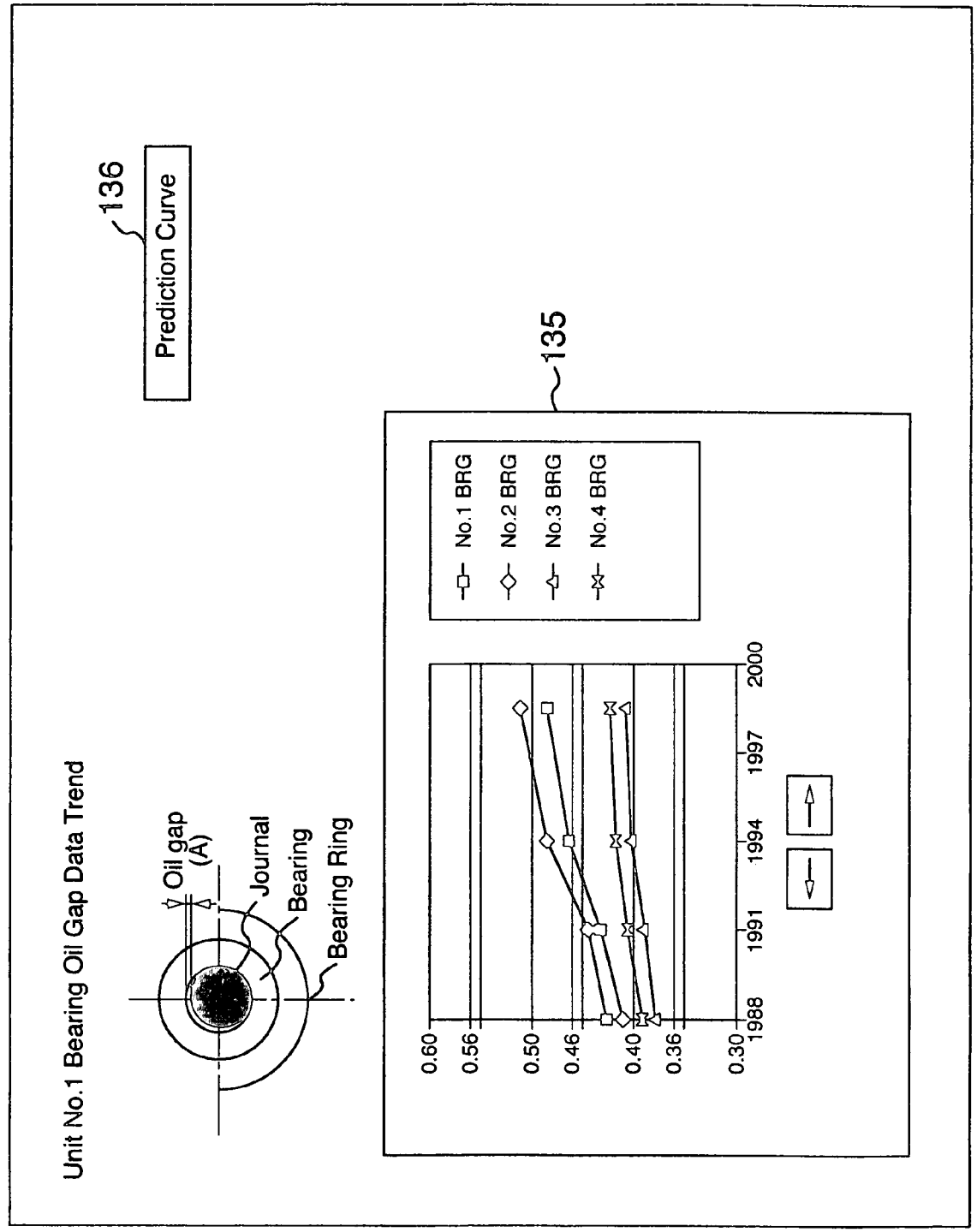
FIG. 27 is a diagram illustrating a screen which is operated by the user and the maker.

FIG. 27 shows one example in which items of trend management necessary for the maintenance activities of various equipment are shown in a graph 135. Consequently, it is possible to graph the trend of change of the state of use of the equipment and provide information for the planning of maintenance activities.

Figure 28:
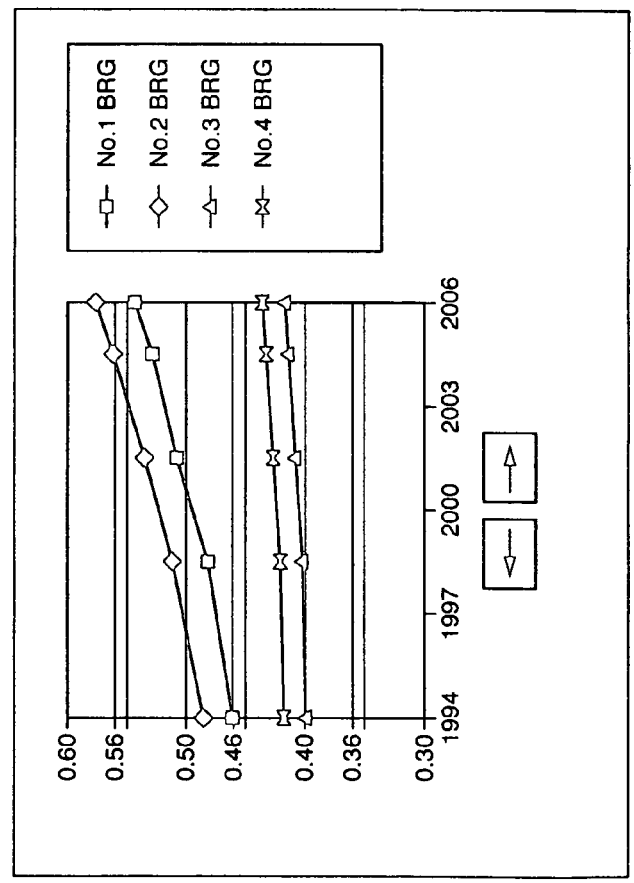
FIG. 28 is a diagram illustrating a screen which is operated by the user and the maker.

Further, if a prediction curve button 136 at upper right on the screen of FIG. 27 is clicked, the operation proceeds to a screen for predicting the future trend of change estimated from the average rate of change in the results of inspection conducted three times in the past. FIG. 28 shows an example of practical application of the trend prediction screen. This trend prediction screen has the function of automatically calculating and displaying dates which exceed the management values set in the graph. Consequently, the user is able to plan maintenance activities more efficiently, and the maker is able to easily present and recommend technical data corresponding to the information.

Figure 29:
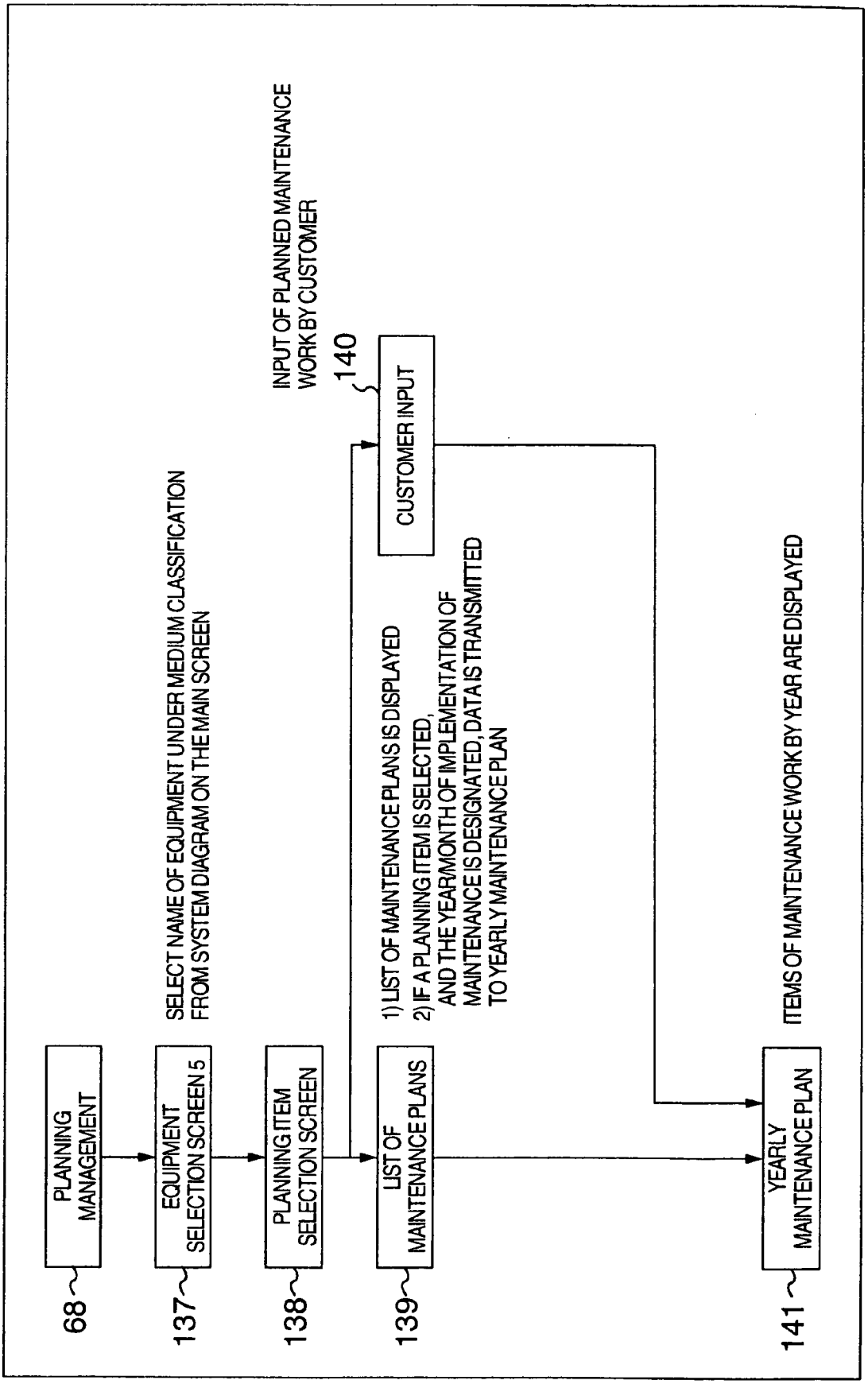
FIG. 29 is a diagram illustrating the flow of operation of a planning management database.

Next, the flow in the case of accessing the planning management database is shown in FIG. 29. If the planning management 68 is accessed after selecting equipment under large classification in the flow described with reference to FIG. 6, an equipment selection screen 5 (137) is displayed to allow the name of equipment under medium classification to be selected.

If the name of the equipment is selected from the system diagram of the selected equipment, the operation proceeds to a planning item selection screen 138 concerning the relevant equipment, and a planning item to be viewed is selected. Here again, the operation does not proceed to the classification of equipment into small groups in the same way as the history management, and the operation proceeds to a screen to be viewed by using the planning item menu. The reason for this is that there are items of maintenance plan information which are related to each other among the medium groups of classification.

Planning items include a maintenance plan list 139 in which work plan items registered in the record management and the history management are displayed in the form of a list, a customer input 140 for inputting a work plan drafted voluntarily by the user, and a yearly maintenance plan 141 in which work items are registered by year. If the year of implementation is designated in the maintenance plan list 139, and if the year of implementation is designated in the customer input 140, automatic registration can be made in the yearly maintenance plan 141.

FIG. 30 shows an example of practical application of the planning item selection screen. If a number 142 in the menu is clicked, the operation proceeds to a screen to be viewed or inputted in.

FIG. 31 shows an example of practical application of the maintenance plan list. A list of maintenance activities to be implemented in the future is displayed in this list. The user studies which work is to be carried out during the period of maintenance activities in the future, and clicks a number 143 of the registered work item. Further, if the user designates a scheduled period of implementation in a year/month window 144 in an upper portion of the screen, and clicks a registration button 145, registration can be made in the yearly maintenance plan list.

FIG. 32 shows an example of practical application of the customer input. In a case where there is an item of work which the user desires to implement apart from a proposal from the maker, the user registers the work item on this screen. If the user clicks a number 146 of the registered work item, designates a scheduled period of implementation in a year/month window 147 in an upper portion of the window, and clicks a registration button 148, registration can be made in the yearly maintenance plan list.

FIG. 33 shows an example of a screen which displays a list of maintenance activities registered by year. By using this screen, the user and the maker are able to grasp the contents of maintenance activities to be implemented in the future, and the user carries out the drafting of detailed schedules of maintenance activities and the arrangement for necessary parts. In addition, the maker is able to grasp the operation and parts arranged for by the user and proceed with the plan, and if there is any shortage of work in the maintenance activities scheduled by the user, the maker makes a recommendation or a proposal.

As described above, in this embodiment, maintenance information concerning generating plants owned by the user is formed into databases on the maker side, and the user accesses via the communication network the plant management system managed by the maker, thereby making it possible to speedily obtain orderly rearranged maintenance information accurately and easily. Thus it becomes possible for the customer's maintenance activities to be implemented efficiently. In addition, although the input and management of data are carried out by the maker who acts as a principal entity, the input is made possible from the user side as well, as necessary. Thus, since both the user and the maker share the maintenance information on the facilities, it becomes possible to make effective use of the information mutually and implement the maintenance activities of the facilities smoothly and rationally.

Namely, in this embodiment, since the maker who has much technical information analyzes the results of maintenance activities carried out by the user, it becomes possible to grasp the situation of the generating plants more accurately. Hence, in accordance with this embodiment, information on the estimation of aged deterioration in the future and maintenance plan information concerning component equipment of facilities subject to maintenance can be timely provided from the maker side to the user.

In addition, since the results of analysis conducted by the maker are made available to the user, the user is able to easily confirm the situation of the generating plates in operation. Additionally, since the user uses the aforementioned information provided by the maker, the user is able to draft a maintenance plan efficiently, thereby making it possible to carry out highly reliable maintenance activities. Consequently, it becomes possible to reduce the life cost of the generating plants owned by the user.

In addition, the maker is able to easily grasp from the system how the user is operating the generating plants and what maintenance plans have been drafted, so that the arrangement for parts necessary for maintenance activities, planning for dispatching engineers, and the like can be conducted efficiently. Accordingly, business merits based on the exchange of maintenance information are produced for both parties, added values in information corresponding to the quality and quantity of information are produced, and information service business is established.

Further, in accordance with this embodiment, since the results of implementation of the maintenance activities are stored as databases, with respect to malfunctions and the like which could be confirmed during the operation or inspection of the generating plants, the user is able to readily search, for example, what similar malfunctions occurred in the past and what countermeasures were taken. Therefore, the user is able to deal with their countermeasure operations in a short period of time, and reduce the period of shutdown of the operating plants, thereby making it possible to improve the availability factor.

In addition, in accordance with this embodiment, from the viewpoint of the user, the management of information on the generating facilities owned by the user can be managed by the maker having detailed technical information on the generating plants, and the user is able to view reliably maintained data, when necessary. Consequently, it is possible to implement highly reliable maintenance activities efficiently, and improve the job efficiency of user engineers in charge of the maintenance activities. Meanwhile, the maker is able to share with the user the maintenance information concerning the generating plants owned by the user, and is able to reliably grasp the maintenance activities which the user intends to implement, permitting appropriate technical support.

What is claimed is:

1. A maintenance information management system, comprising:

a parts management database for storing large classification equipment information of major parts, obtained by classifying equipment making up a facility subject to maintenance owned by a user; medium classification equipment information of medium parts, obtained by classifying said major parts; and small classification equipment information of small parts, obtained by classifying said medium parts;

a history management database for storing a history of inspection or replacement of the equipment of said facility of said user;

wherein said maintenance information management system is structured so that maintenance information management of said facility is carried out at a maker of said equipment, and maintenance information of said facility is shared by the maker and user; and a processing program by which said large classification equipment information is displayed as a first equipment selection image, wherein when one of said major parts is selected by a user on said first equipment selection image, said selected major part is displayed as a second equipment selection image displaying a system diagram of a plurality of medium parts making up said selected major part; when one of said medium parts is selected by a user on said second equipment selection image, said selected medium part is displayed as a third equipment selection image displaying a list of small parts making up said selected medium part; when one of said small parts is selected by a user on said third equipment selection image, said selected small part is displayed as a fourth equipment selection image displaying an assembly drawing or a sectional drawing together with parts information of parts making up said selected small part; a trend graph of equipment of said facility is displayed as a fifth equipment selection image, said trend graph being obtained by predicting a trend of change in the future of the equipment selected from a trend of change of past states of use of the equipment on the basis of information of results of past inspection of the equipment accumulated in said history management database; and history information of inspection or replacement carried out in the past concerning said parts making up said selected small part and stock information concerning said parts are displayed as a sixth equipment selection image on the basis of said history management database.

2. A maintenance information management system according to claim 1, wherein by said processing program, said trend graph is displayed on the basis of average variation rate data of results of inspection carried out in the past, said results of inspection being stored in said parts management database and history management database.

* * * * *